United States Patent
Price et al.

(10) Patent No.: US 12,544,534 B2
(45) Date of Patent: Feb. 10, 2026

(54) FOLEY CATHETER SYSTEM WITH SPECIMEN SAMPLING PORT DISINFECTANT CAP AND CORRESPONDING TRAY PACKAGING SYSTEMS AND DRAINAGE PRODUCTS

(71) Applicant: Medline Industries, LP, Northfield, IL (US)

(72) Inventors: Ann Price, Chicago, IL (US); Lucas Crosby, Crystal Lake, IL (US); Mary Pat Eble, Bellevue, WA (US)

(73) Assignee: Medline Industries LP, Northfield, IL (US)

( * ) Notice: Subject to any disclaimer, the term of this patent is extended or adjusted under 35 U.S.C. 154(b) by 906 days.

(21) Appl. No.: 17/574,654

(22) Filed: Jan. 13, 2022

(65) Prior Publication Data

US 2023/0091798 A1    Mar. 23, 2023

Related U.S. Application Data

(60) Provisional application No. 63/247,736, filed on Sep. 23, 2021.

(51) Int. Cl.
| | |
|---|---|
| *A61M 25/00* | (2006.01) |
| *A61B 10/00* | (2006.01) |
| *A61F 5/44* | (2006.01) |
| *A61M 39/20* | (2006.01) |

(52) U.S. Cl.
CPC ......... *A61M 25/002* (2013.01); *A61B 10/007* (2013.01); *A61F 5/44* (2013.01); *A61M 25/0017* (2013.01); *A61M 39/20* (2013.01); *A61M 2209/06* (2013.01); *A61M 2209/10* (2013.01)

(58) Field of Classification Search
CPC .............. A61B 10/007; A61M 25/002; A61M 25/0017; A61M 39/20; A61M 2209/06; A61M 2209/10; A61M 25/0111; A61F 5/44; A61F 5/453; A61F 5/455
See application file for complete search history.

(56) References Cited

U.S. PATENT DOCUMENTS

| | | | |
|---|---|---|---|
| 7,435,423 B2 * | 10/2008 | Collinge | A61F 17/00 424/443 |
| 8,414,530 B2 | 4/2013 | Mason | |
| 10,792,484 B2 | 10/2020 | Houde et al. | |
| 11,464,962 B2 * | 10/2022 | Bedoe | A61M 39/20 |
| 2009/0216197 A1 * | 8/2009 | Russo | A61M 25/02 604/179 |
| 2015/0246352 A1 * | 9/2015 | Bullington | A61B 50/33 422/546 |
| 2019/0099239 A1 | 4/2019 | Ready et al. | |
| 2019/0344044 A1 * | 11/2019 | Dickinson | A61M 25/002 |
| 2020/0197686 A1 | 6/2020 | Anderson et al. | |

(Continued)

OTHER PUBLICATIONS

"SwabFlush Pre-Filled Saline Flush Syringe with Disinfection Cap", Medline Brochure; Unknown exact publication date but prior to 2018,.

*Primary Examiner* — Eric F Winakur
*Assistant Examiner* — Noah M Healy
(74) *Attorney, Agent, or Firm* — Philip H. Burrus, IV

(57) ABSTRACT

A medical procedure kit includes a Foley catheter having a specimen sampling port coupled thereto. A disinfectant cap is selectively attachable to, and detachable from, the specimen sampling port of the Foley catheter.

20 Claims, 21 Drawing Sheets

(56) References Cited

U.S. PATENT DOCUMENTS

| | | | |
|---|---|---|---|
| 2020/0360103 A1* | 11/2020 | Knapp | B29D 22/003 |
| 2021/0146114 A1 | 5/2021 | Grant et al. | |
| 2021/0170157 A1 | 6/2021 | Grant et al. | |
| 2021/0196922 A1* | 7/2021 | Hughett, Sr. | A61B 50/30 |
| 2022/0273931 A1* | 9/2022 | Jiang | A61M 39/162 |

* cited by examiner

— PRIOR ART —

FOLEY CATHETER SYSTEM WITH SPECIMEN SAMPLING PORT DISINFECTANT CAP AND CORRESPONDING TRAY PACKAGING SYSTEMS AND DRAINAGE PRODUCTS

CROSS REFERENCE TO PRIOR APPLICATIONS

This application claims priority and benefit under 35 USC § 119(e) from U.S. Provisional Application Ser. No. 63/247,736, filed Sep. 23, 2021, which is incorporated by reference for all purposes.

BACKGROUND

Technical Field

This disclosure relates generally to medical devices, and more particularly to medical devices having specimen sampling ports.

Background Art

Medical devices, including surgical instruments, supplies, and so forth, are generally shipped from manufacturer to medical services provider in sterile packaging. For example, a scalpel may be shipped to a surgeon in a plastic, vacuum-sealed, sterile package. Similarly, bandages may be shipped in paper, plastic, or paper composite sterile wrappers. When the medical services provider is ready to use the medical supply, the sterile package is removed. The medical services provider then uses the object in accordance with the procedure being performed.

Once the procedure has been performed, components that were once sterile quickly become non-sterile. Illustrating by example, in the context of a Foley catheter, the coiled tubing and drainage bag, which were once sterile within the package, are now exposed to the environment. Bacteria, microbes, viruses, and other organisms can attach to these components. When an otherwise sterile object contacts these components, it will quickly become non-sterile as well. If the previously sterile object contacts vulnerable portions of a patient, infections or other maladies can ensue. It would be advantageous to have an improved Foley catheter system that reduced the incidence of such infections and maladies.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
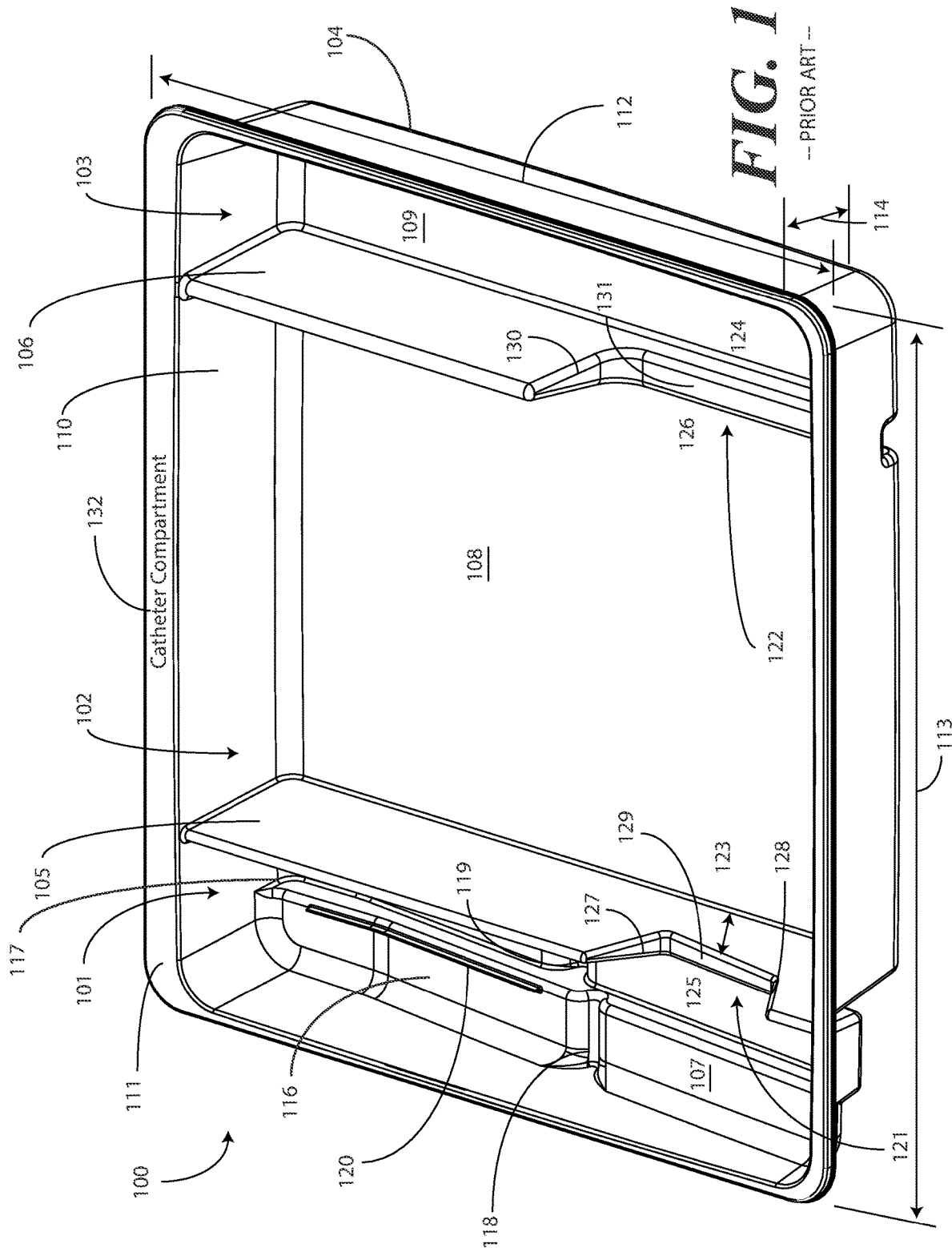
FIG. 1 illustrates a top, front, right perspective view of one explanatory tray.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DISCLOSURE

Before describing in detail embodiments that are in accordance with the present disclosure, it should be observed that the embodiments reside primarily in combinations of method steps and apparatus components related to medical kits and devices, one example of which is a Foley catheter, that include disinfectant caps for specimen sampling ports. Alternate implementations are included, and it will be clear that any method steps may be executed out of order from that shown or discussed, including substantially concurrently or in reverse order, depending on the desired application. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, it is expected that one of ordinary skill, notwithstanding possibly significant effort and many design choices motivated by, for example, available time, current technology, and economic considerations, when guided by the concepts and principles disclosed herein will be readily capable of generating such assemblies and executing such method steps with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a medical procedure kit, medical device, or combinations thereof that include a specimen sampling port and a disinfectant cap. In one or more embodiments, a Foley catheter has a specimen sampling port coupled thereto that is configured for taking urine samples from a patient. In other examples, the medical device and/or medical kit can include devices other than a Foley catheter, including a single draw fluid drain bag or a urine meter. Other devices suitable for use with disinfecting caps will be obvious to those of ordinary skill in the art having the benefit of this disclosure.

In one or more embodiments, the disinfectant cap is selectively attachable to, and detachable from, the specimen sampling port of the medical device, one example of which is a Foley catheter. In one or more embodiments, a bacteria-killing fluid is held within a fluid-retaining medium situated within an interior of the disinfectant cap.

Illustrating by example, in one or more embodiments a sponge saturated with a fluid comprising at least seventy percent isopropyl alcohol is situated within the interior of the disinfectant cap. When the disinfectant cap is attached to the specimen sampling port of a medical device, two things occur: First, the disinfectant cap prevents bacteria from entering the specimen sampling port. Second, the inclusion of the bacteria-killing fluid kills any bacteria present along the surfaces of the specimen sampling port. Advantageously, when the disinfectant cap is removed from the specimen sampling port, the surfaces are bacteria and microbe free, thereby ensuring that the patient is not infected when additional urine samples are taken from the patient through a Foley catheter, a urine meter, or a fluid sampling back, using an attached specimen sampling port.

The disinfectant cap can be positioned within a container, such as a plastic bag, foil pouch, plastic bottle, or other container situated within the medical procedure kit. The disinfectant cap can be placed by itself in the container in one or more embodiments. In other embodiments, the disinfectant cap can be positioned within the container with other items. For instance, in one embodiment using a Foley catheter as an explanatory medical device, the disinfectant cap is positioned within a bag along with a Foley catheter securement device, one or more swab sticks, and a Foley catheter insertion tag. Other implements suitable for packaging with the disinfectant cap will be obvious to those of ordinary skill in the art having the benefit of this disclosure.

The medical procedure kit can take various forms. Illustrating by example, again using a Foley catheter for explanatory purposes, in one or more embodiments the medical procedure kit includes a single-layer tray comprising a first compartment at least partially bounded by a first base member, a second compartment at least partially bounded by a second base member, and a third compartment at least partially bounded by a third base member. At least one syringe can be positioned within the first compartment, while the Foley catheter and a fluid drain bag that are coupled together by a coiled tubing can be situated within the second compartment. The container including the Foley catheter securement device, the one or more swab sticks, and the Foley catheter insertion tag can be situated within the third compartment.

In another embodiment, the medical procedure kit includes a first tray and a second tray that is nested atop, and suspended by, the first tray. In one or more embodiments, the first tray defines a plurality of preformed compartments configured to receive and house a plurality of medical implements. The Foley catheter can be positioned within a Foley catheter compartment of the plurality of preformed compartments of the second tray, while a drainage system is stowed within an interior of the first tray. The drainage system can include at least a portion of a coiled tubing coupled between a Foley catheter and a fluid drain bag. The container enclosing the disinfectant cap can be positioned in the first tray or the second tray.

In still other embodiments, the container enclosing the disinfectant cap can be attached to the coiled tubing coupled between the Foley catheter and the fluid drain bag. Illustrating by example, when the container comprises a clear plastic bag, the clear plastic bag can be attached to the coiled tubing so that the disinfectant cap is easy to see when the medical procedure kit is opened. Other placements for the disinfectant cap and/or the container enclosing the disinfectant cap will be obvious to those of ordinary skill in the art having the benefit of this disclosure.

In one or more embodiments, the inclusion of a disinfectant cap within a medical procedure kit containing a Foley catheter (or other device), coiled tubing, and fluid drain bag elevates embodiments of the disclosure from prior art medical procedure kits from an infection prevention perspective by providing an additional way for the overall medical procedure kit to alleviate the risk of catheter-associated urinary tract infections by preventing bacteria from entering the Foley catheter system through the specimen sampling port. Embodiments of the disclosure are distinguished from prior art medical procedure kits in that no prior art medical procedure kit includes a disinfectant cap that can selectively couple to a urine sampling port.

Embodiments of the disclosure contemplate that the colonization of bacteria on needleless connectors such as the urine sampling port coupled to a Foley catheter can be the cause of at least fifty percent of post-insertion catheter related infections. Additionally, embodiments of the disclosure contemplate that compliance with manual disinfection protocols for specimen sampling ports is quite low in practice. Advantageously, inclusion of the disinfectant cap within a Foley catheter medical procedure kit creates a closed system when the disinfectant cap is coupled to the specimen sampling port where the bacteria-killing fluid held by the fluid-retaining medium disinfects the exterior surfaces of the specimen sampling port within thirty seconds after application. Additionally, where the bacteria-killing fluid is at least seventy percent isopropyl alcohol, can leave the specimen sampling port disinfected for up to seven days presuming the disinfectant cap is not detached from the specimen sampling port during that time. In one or more embodiments, the disinfectant cap can only be twisted onto a specimen sampling port in one direction, thereby reducing variation in the disinfection technique application of the disinfectant cap to a specimen sampling port offers.

In one or more embodiments, attachment of the disinfectant cap to a specimen sampling port of a Foley catheter prevents bacteria from migrating into the system through the opening of the specimen sampling port. Bacteria migration into the Foley catheter system through the specimen sampling port is an issue in the field, and currently if a nurse needs to clean the specimen sampling port of a Foley catheter system the only option available is the manual "scrub the hub" technique. Embodiments of the disclosure provide an improved mechanism for cleaning the specimen sampling port. By placing the disinfectant cap on the specimen sampling port, embodiments of the disclosure keep the specimen sampling port and its corresponding access site (and threads or snap features, where included) clean from bacteria, thereby reducing the incidence of catheter associated urinary tract infections. This benefit is especially advantageous in situations where the patient to which the Foley catheter is attached is taking large amounts of medication or has fecal incontinence, as there is a greater risk of *E coli* entering the system in these situations. Moreover, when nurses take urine samples or measure IAP, they gain access to the interior of the Foley catheter system via the specimen sampling port. Accordingly, every time this occurs in one or more embodiments the nurse is instructed to remove the previous disinfectant cap, discard it, and replace it with a new disinfectant cap. That said, in many embodiments the disinfectant cap is packaged within a tray of a medical procedure kit. However, embodiments of the disclosure contemplate that the disinfectant cap could also be sold individually for replacement. Ultimately, the addition of the disinfectant cap adds value in that it helps to prevent catheter associated urinary tract infections initiating at the urine sampling port of a Foley catheter system. Other advantages will be described in more detail below. Still others will be obvious to those of ordinary skill in the art having the benefit of this disclosure.

It should be noted that the disinfectant caps described below can be used with a variety of medical devices. These include a Foley catheter, a urine meter having a specimen sampling port, and/or a single draw fluid drain bag having a specimen sampling port. To begin, for simplicity of illustration, the medical device described for use with a disinfectant cap will be a Foley catheter. However, other devices will be described in later sections for completeness. For instance, a single draw fluid drain bag will be described below with reference to FIG. 24. Similarly, a urine meter will be described below with reference to 25. Other devices that include specimen sampling ports and that are suitable for use with the disinfectant caps described below will be obvious to those of ordinary skill in the art having the benefit of this disclosure. Accordingly, attention will first be turned to use of disinfectant caps with a Foley catheter and its corresponding medical kit.

Figure 2:
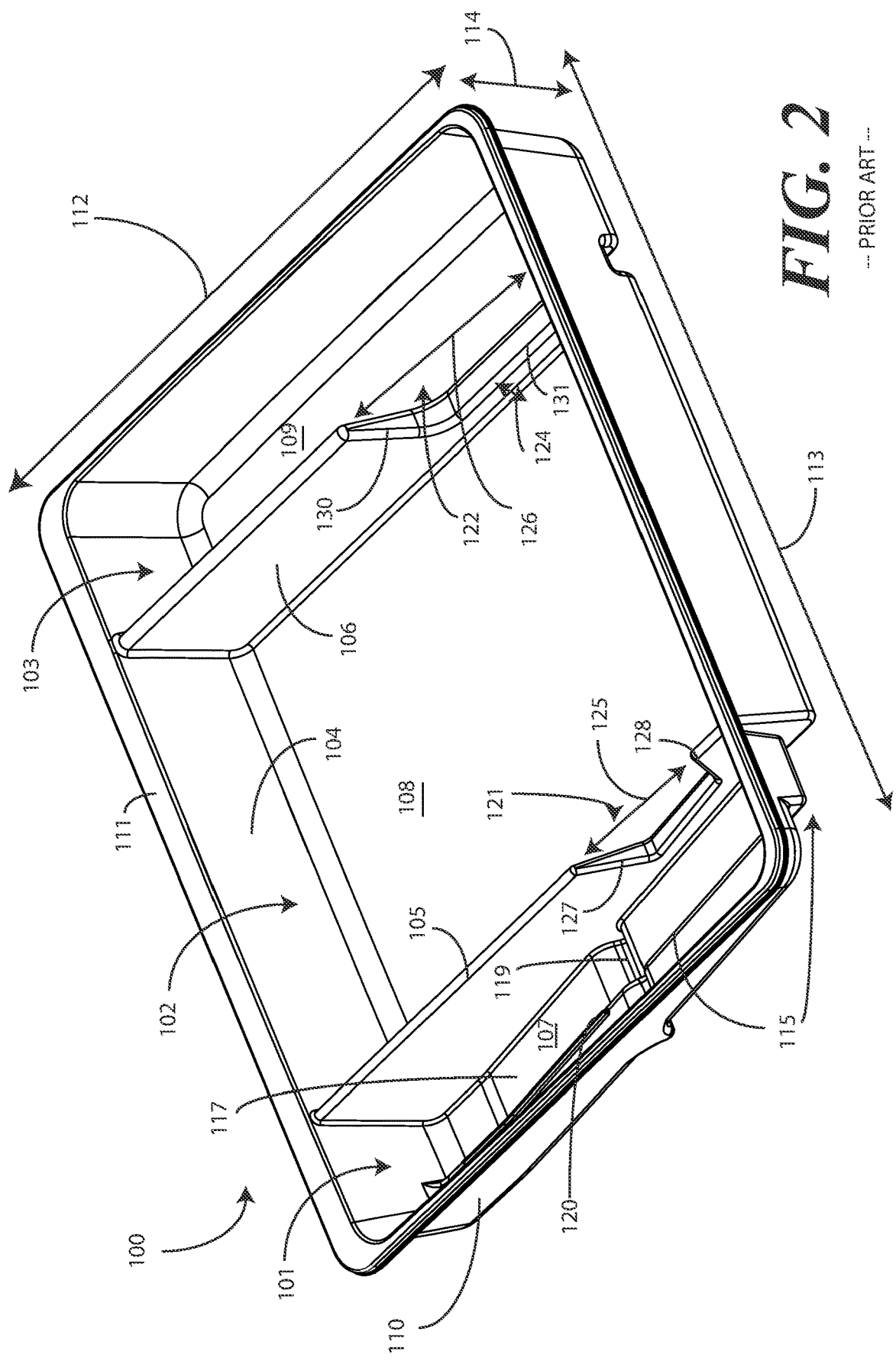
FIG. 2 illustrates a top, front, left perspective view of one explanatory tray
Figure 3:
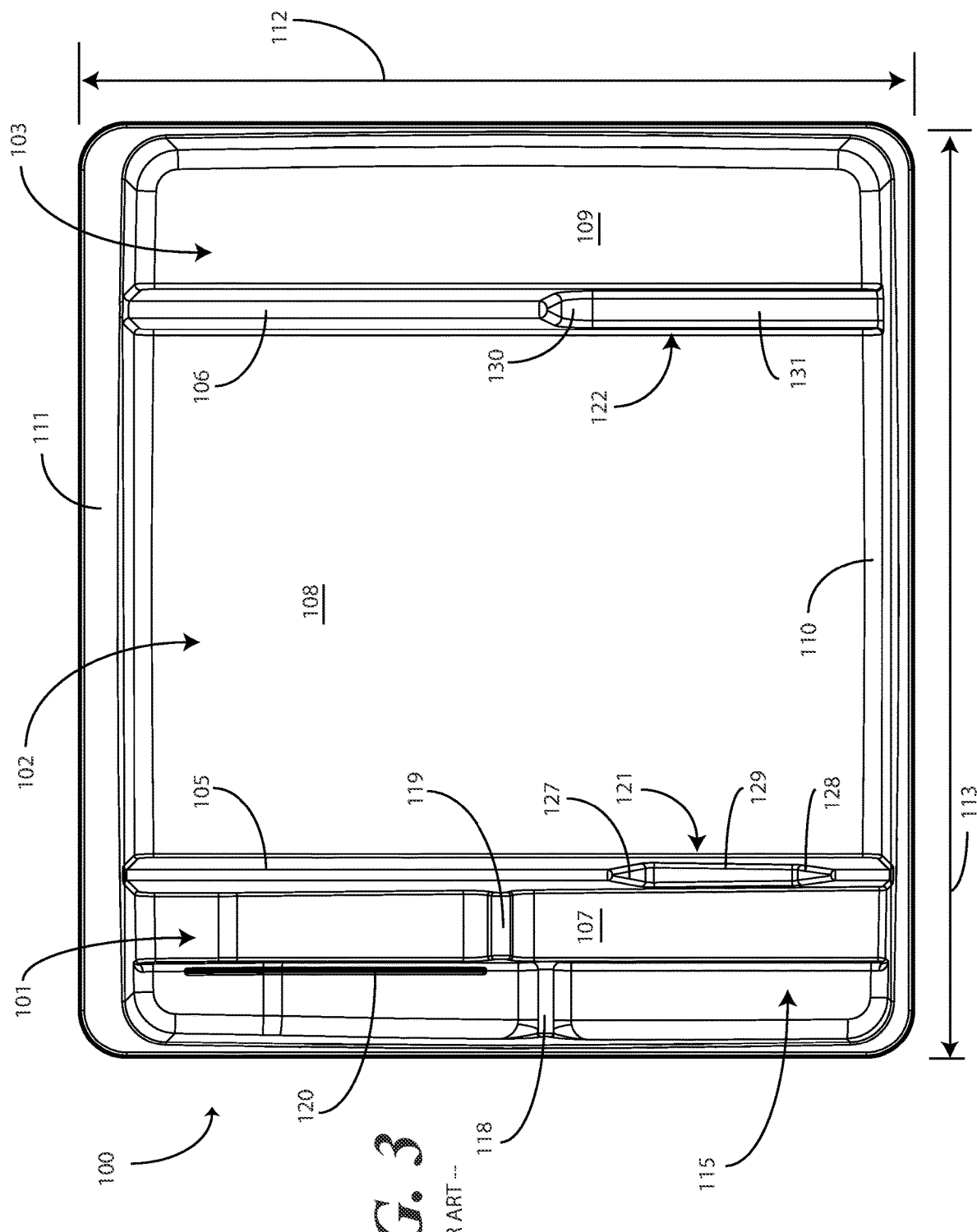
FIG. 3 illustrates a top plan view of explanatory tray.
Figure 4:
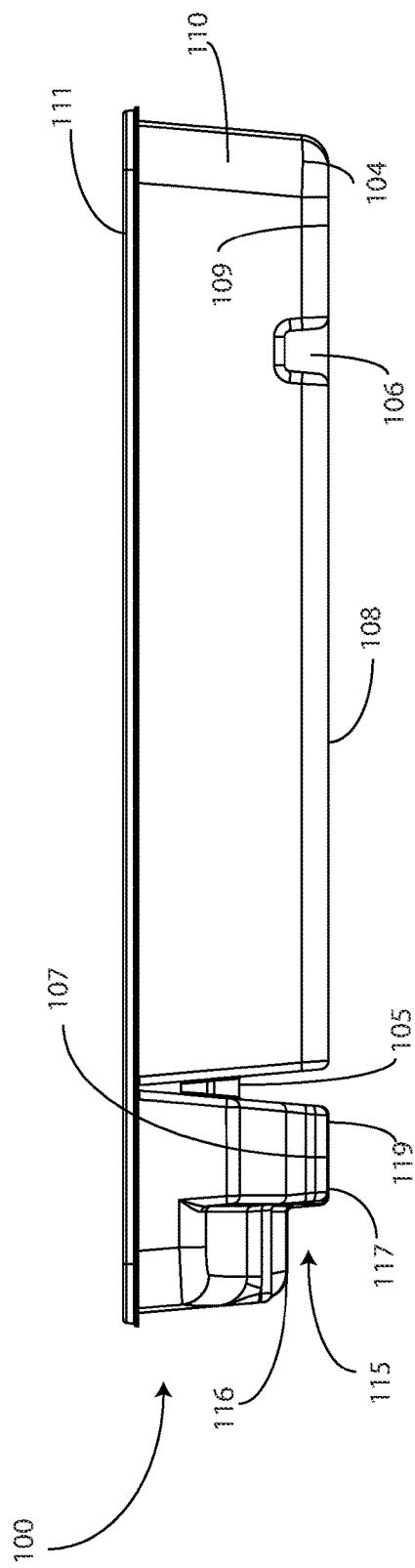
FIG. 4 illustrates a front elevation view of one explanatory tray.
Figure 5:
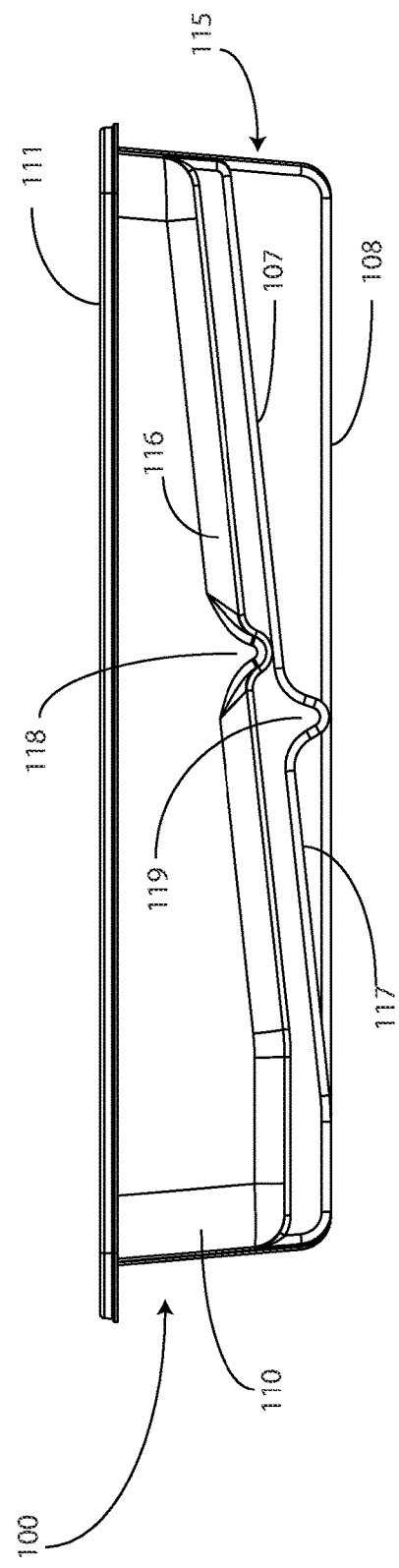
FIG. 5 illustrates a cut-away, left elevation view of one explanatory tray.
Figure 6:
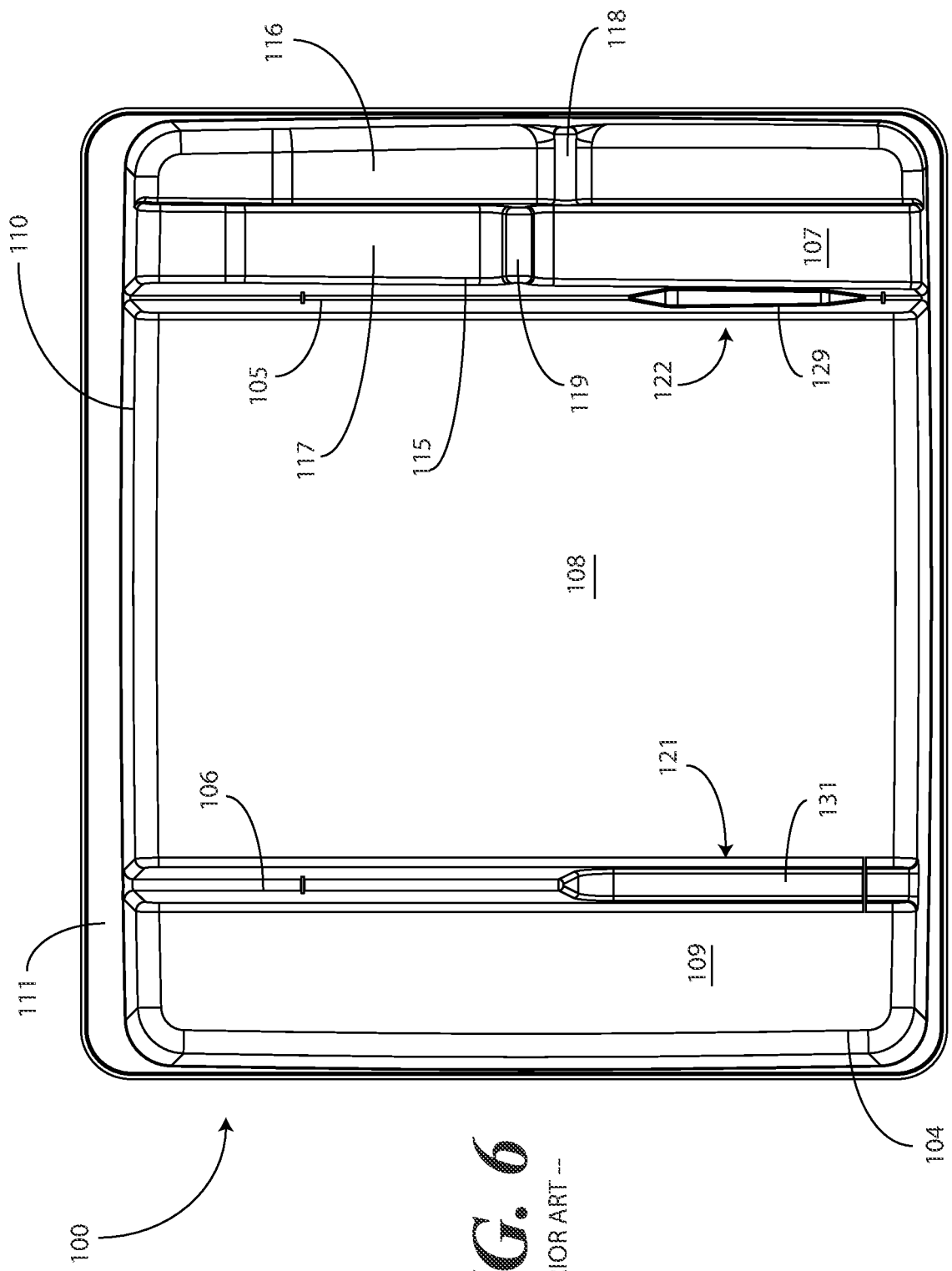
FIG. 6 illustrates a bottom plan view of one explanatory tray.

Turning now to FIGS. 1-6, illustrated therein are views of one embodiment of a tray 100 configured to accommodate a Foley catheter, its operatively coupled coiled tubing, and its operatively coupled fluid drain bag. FIG. 1 illustrates a top, front right perspective view of the tray 100. FIG. 2 illustrates a top, front, left perspective view of the tray 100. FIG. 3 illustrates a top plan view of the tray 100. FIG. 4 illustrates a front elevation view of the tray 100. FIG. 5 illustrates a cut-away, left elevation view of the tray 100. Likewise, FIG. 6 illustrates a bottom plan view of the tray 100. For simplicity of discussion, these figures will be referred to collectively with like reference numerals referring to identical or functionally similar elements throughout the separate views.

The tray 100 is formed by a contoured surface 104 that defines the various features and compartments of the tray 100. The contoured surface 104 of the tray 100 can be manufactured in various ways. For example, the tray 100 can be thermally formed on a mold from a soft thermoplastic, such as styrene or polystyrene. The tray 100 can be injection molded. The tray can be poured on a mold using a quick setting plastic, epoxy, or resin.

Explanatory dimensions of the tray 100 are as follows: The length 112 can be between nine and twelve inches, such as ten inches. One illustrative length 112 may be 10.380 inches. Similarly, the width 113 can be between eight and eleven inches, such as nine inches. One illustrative width 113 is 9.250 inches. The height 114 can be between one and three inches. One illustrative height 114 is 1.750 inches.

The tray 100 includes three main compartments: a first compartment 101, a second compartment 102, and a third compartment 103. The first compartment 101 is separated from the second compartment 102 by a first barrier 105. The second compartment 102 is separated from the third compartment 103 by a second barrier 106.

The compartments are open from the top of the tray 100—the top being opposite the base members of the tray 100—and are bounded on the bottom by a first compartment base member 107, a second compartment base member 108, and a third compartment base member 109. The compartments are bounded on the sides by a perimeter wall 110. The perimeter wall 110 ends in a horizontal flange 111 extending substantially orthogonally from the perimeter wall 110. The top of the tray 100 could have a hinged or snap-coupled lid that is opened or removed to reveal the compartments there beneath. Similarly, the horizontal flange 111 can be omitted, with each of the first compartment 101, the second compartment 102, and the third compartment 103 being bounded by a wall, be it the perimeter wall 110 or another wall, that extends distally from the various compartment base members 107, 108, 109 to a terminating edge.

The tray 100 is configured to hold or otherwise accommodate the necessary devices and materials to perform a Foley catheter-based procedure on a patient. The tray 100 is configured to hold not only the Foley catheter, its operatively coupled coiled tubing, and its operatively coupled fluid drain bag, but the medical devices corresponding to Foley catheter use as well. Using one illustrative procedure as an example, the following devices will be used: a syringe holding sterile water, a syringe holding lubricating jelly or another equivalent lubricant, a catheter assembly, skin cleansing or preparation materials, and a specimen jar. The various compartments and features of the tray 100 shown in FIGS. 1-6 will be described for use with these devices. As will be described in more detail below with reference to FIG. 7, additional objects can be included with the tray, such as one or more towels, a drape to cover the patient, rubber gloves, hand sanitizing materials, swab sticks, a securement device, a Foley insert tag, a printed instruction pamphlet, and so forth. As will be described below with reference to FIGS. 19-22, in one or more embodiments a disinfectant cap that is selectively attachable to, and detachable from, a urine sampling port coupled to the Foley catheter, and that includes a bacteria-killing fluid held within a fluid-retaining medium situated within an interior of the disinfectant cap can be included as well.

For procedures using the syringe holding sterile water, syringe holding lubricating jelly, the Foley catheter, its operatively coupled coiled tubing, and its operatively coupled fluid drain bag, and specimen jar, the tray 100 is configured such that these objects are ordered in accordance with their order of use during the Foley catheterization procedure. For example, the tray 100 includes a first compartment 101 for accommodating one or more syringes, a second compartment 102 for accommodating the Foley catheter, its operatively coupled coiled tubing, and its operatively coupled fluid drain bag, and optionally one or more syringes, and a third compartment 103 for accommodating at least the specimen jar. These devices stowed in the various compartments will be illustrated and described with respect to FIG. 7 below. The discussion of FIGS. 1-6 will include the features of the tray 100 that make the tray 100 suitable for accommodating these devices.

The first compartment base member 107 is contoured. The first compartment base member 107 can include features that hold any syringes stored within the first compartment 101 at different heights. The first compartment base member 107 includes a stair-stepped contour 115 suitable that supports syringes at different heights.

A first step portion 116 of the stair-stepped contour 115 may be at a different height within the tray 100 than a second step portion 117 of the stair-stepped contour 115. The first step portion 116—which is disposed farther from the first barrier 105 than the second step portion 117—is shallower than the second step portion 117. Said differently, the second step portion 117 is disposed at a greater depth within the tray 100 than the first step portion 116.

The contours of the first compartment 101 can serve as mnemonic device when for medical implements stored within the first compartment 101. For example, it may be intuitive that a higher syringe may need to be used first. Accordingly, placing this "first to be used" syringe on a higher step portion will indicate that this syringe should be used first. This intuition is further enforced when the higher position is situated farther to the left in a left-to-right usage, i.e., like reading a book, configuration. Thus, a user receives a mnemonic reminder to use a syringe disposed on the first step portion 116 prior to a syringe disposed on the second step portion 117, as it is both higher and farther to the left.

Where syringes are stowed in the first compartment 101, the first compartment base member 107 can further be configured for syringe ease of use. For example, the first compartment base member 107 is inclined relative to other compartment base members. In FIGS. 1-6, the second compartment base member 108 and third compartment base member 109 are substantially coplanar with each other. Further, the second compartment base member 108 and third compartment base member 109 are generally flat in these views. The first compartment base member 107 could be substantially flat.

In this illustrative tray 100, the first compartment base member 107 is configured to be inclined relative to one or both of the second compartment base member 108 and third compartment base member 109. As such, the stair-stepped contour 115 forms a ramp upon which syringes may be placed so that the plunger of each syringe is predisposed to project upward and out of the tray 100. Said differently, the stair-stepped contour 115 is configured such that the first step portion 116 and the second step portion 117 are disposed in a non-parallel orientation relative to the second compartment base member 108. This configuration makes it easier for a medical services provider to grasp the syringes and remove them from the tray 100.

The first compartment base member 107 may include other features suitable for accommodating one or more syringes as well. Any of the first compartment base member 107, the first step portion 116, or the second step portion 117 can include recesses 118, 119 for accommodating a syringe flange. These recesses 118, 119 generally function to prevent the syringes from sliding lengthwise within the first compartment 101. Similarly, any of the first compartment base member 107, the first compartment sidewalls, the first step portion 116, or the second step portion 117 include protrusions 120 that help to prevent the syringes from sliding laterally within the first compartment 101.

One or both of the first barrier 105 and the second barrier 106 include optional openings disposed therein. In FIGS. 1-6, the first barrier 105 includes a first opening 121 between the first compartment 101 and the second compartment 102. Similarly, the second barrier 106 includes a second opening 122 between the second compartment 102 and the third compartment 103. Each of these openings has an opening depth associated therewith. Similarly, each opening has an opening width associated therewith. In FIGS. 1-6, the first opening 121 is bounded by a first opening base member 129 and two inclined first opening side members 127, 128, while the second opening 122 is bounded by a second opening base member 131, an inclined second opening side member 130, and the perimeter wall 110.

While the opening depths can be the same, the opening depths are different in FIGS. 1-6. For example, in FIGS. 1-6, the first opening 121 has a first opening depth 123 that is less than the second opening depth 124 of the second opening 122. Similarly, the opening widths are different. For example, in FIGS. 1-6, the first opening 121 has a first opening width 125 that is less than the second opening width 126 of the second opening 122. Such a disparity in opening depths and widths, as well as the inclusion of inclined opening side members, provides an advantage in some applications.

For instance, in many Foley catheter procedures a pair of syringes—such as syringes having a one-half inch diameter—fits easily into the first compartment 101 when the tray 100 is made with the illustrative dimensions set forth above. However, some procedures require one or more of the syringes to be larger. Additionally, in still other procedures syringes are used in different orders. Where syringes that are larger in diameter are required, these larger syringes are capable of nesting within the first opening 121 and second opening 122. The inclined opening side members prevent the syringe from moving lengthwise, while the disparate opening heights present the plunger of the syringe to the medical services provider for easy removal from the tray 100. Where the syringes are used in different orders, or simply for design choice, one syringe can be placed in the first compartment 101, while another syringe can be placed in the second compartment 102, and so forth.

The stair-stepped contour 115, working in tandem with the first opening 121, gives the tray additional advantages. For instance, the first compartment base member 107 allows the first compartment 101 to be used as a lubricant applicator for the catheter.

Specifically, the medical services provider may dispense the lubricating jelly into the first compartment 101 after removing the syringes therefrom. This lubricating jelly is dispensed along the second step portion 117. Where included, and where lower than the first step portion 116, the second step portion 117 serves as a channel in which the lubricating jelly may spread. A medical services provider may then pass the at least a tip of the Foley catheter from the first compartment 101 into the second compartment 102, optionally through the first opening 121, and into the lubricating jelly. The tip or more of the Foley catheter passes through the channel formed by the second step portion 117, i.e., along the second step portion 117 through the dispensed lubricating jelly. From there, the Foley catheter is passed out the top of the tray 100 to the patient.

This feature of the tray 100 greatly eases the application of lubricating jelly to the catheter. The tray 100 is packaged with printed instructions showing the medical services provider how to apply lubricating jelly in this manner.

Alternative methods may be used to apply the lubricating jelly as well. For example, the lubricating jelly can be dispensed directly onto the Foley catheter and/or its operatively coupled tubing while these components are situated in or above either the first compartment 101 or the second compartment 102. Excess lubricant falling from the catheter tubing can then collect, and be retained, in any of the first compartment 101, the second step portion 117 of the first compartment 101, or the second compartment 102.

This particular feature highlights another advantage of the "compartmentalized" structure. As the tray 100 includes multiple compartments, various tasks associated with a Foley catheterization procedure can be completed while keeping the Foley catheter within the tray 100. The ability to keep the catheter in the tray 100 reduces the risk that the Foley catheter, its operatively coupled coiled tubing, and its operatively coupled fluid drain bag, or corresponding devices, will be contaminated with bacteria or microbes on other objects within the procedure room.

Illustrating by example, when the first compartment 101 is used to apply lubricating jelly to the Foley catheter or its operatively coupled coiled tubing, the lubricating jelly can be applied while these components are completely contained within the confines of the tray 100. This reduces the risk that the Foley catheter or its operatively coupled coiled tubing will become contaminated. This correspondingly reduces the risk of infection for the patient receiving the catheter.

Systems in which the catheterization procedure components are shipped in separate and/or stacked containers may contribute to substandard techniques in that the catheter can become contaminated when moving it from its shipping container. Consequently, the patient can be at an elevated risk of infection as the catheter is moved from one tray to another. A solution to this problem is the provision of a tray 100 with compartments. Further, the first compartment 101 allows the Foley catheter can stay in place during and after lubrication. By having easy access to the components disposed in the tray 100, the medical services provider can more easily prepare and use the components within the tray 100. This helps to minimize the risk of contaminating the patient or the sterile field during the procedure.

The second step portion 117 is configured to be inclined at a shallower angle than the first step portion 116 in at least a portion opposite the recess 119 from the first opening 121. When configured in such a fashion, the second step portion 117 includes a "cutdown" so that the catheter can stay within the channel both during and after lubrication.

Additionally, the Foley catheter can be placed in both the first opening 121 and second opening 122 during lubrication. When positioned in this configuration, the second opening 122 helps to align the catheter with the first opening for easy passage through the lubrication channel formed by the second step portion 117.

The tray 100 of FIGS. 1-6 includes additional advantages. For example, instructions 132 or other graphical indicia can be printed, placed upon, or molded into the tray. The graphical indicia are molded into the horizontal flange 111. However, it can be molded into other portions of the tray 100, including the base members of the compartments, along the barriers, and so forth. Compartment designations can be placed above each compartment to ensure the medical services provider uses the correct device or material at the correct time. Expiratory dates for materials or devices disposed within the tray 100 may be molded into portions of the tray 100.

Another advantage of the tray 100 is that its compartmentalized configuration helps to reduce the risk of contaminating a patient or compromising the sterile nature of the components stored in the tray 100. Since a Foley catheter, its operatively coupled coiled tubing, and its operatively coupled fluid drain bag, and medical devices corresponding to Foley catheter use, are stored within the same tray 100, the risk of cross-contamination between sterile work areas and non-sterile spaces is minimized. Further, by having the Foley catheter, its operatively coupled coiled tubing, and its operatively coupled fluid drain bag, and the devices corresponding to catheter use stowed in a one-level tray rather than a multi-level, stacked configuration, the medical services provider can more easily prepare and use the catheter and corresponding devices disposed within the tray 100.

Figure 7:
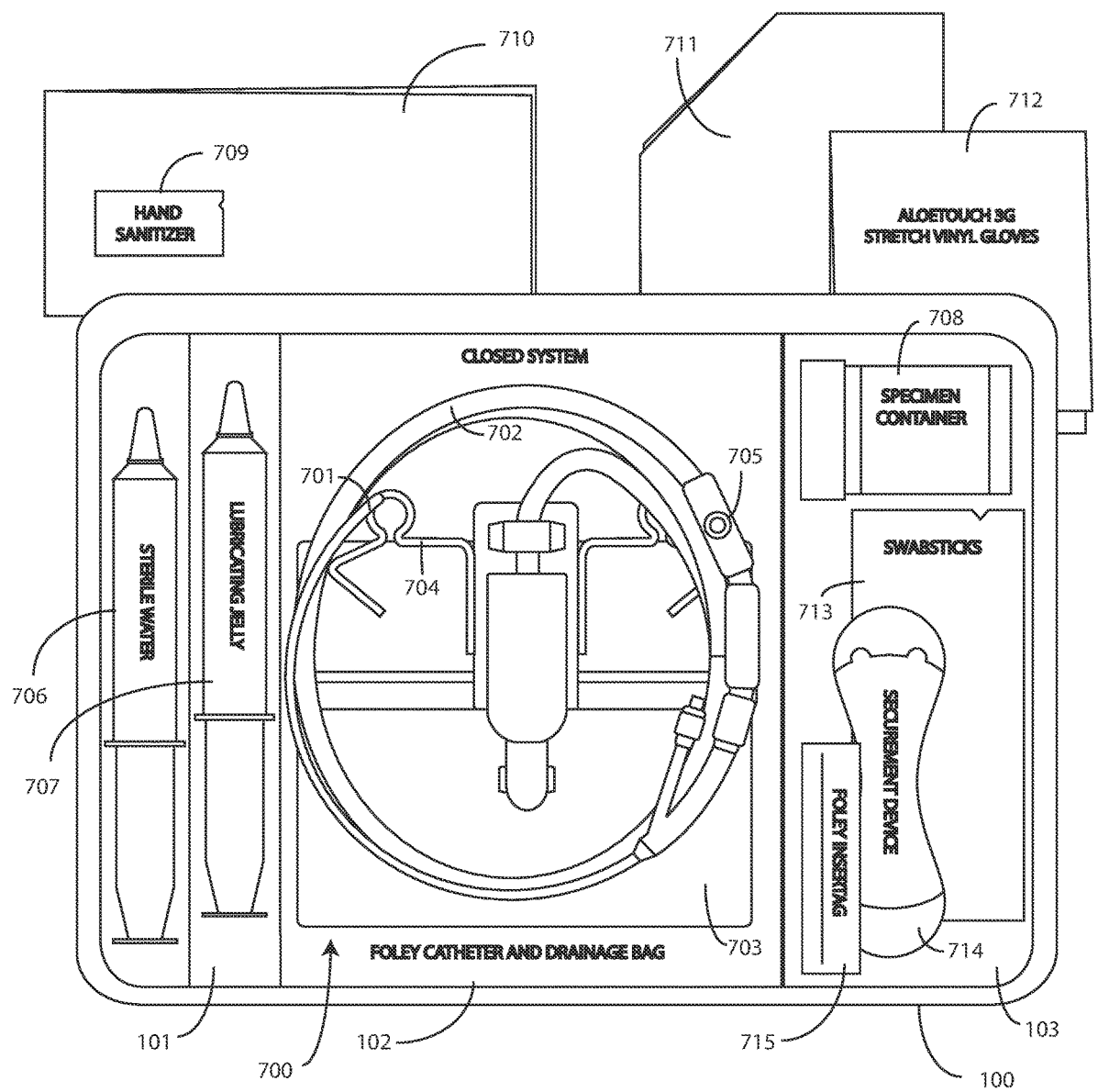
FIG. 7 illustrates a top plan view of a medical kit.

Turning now to FIG. 7, illustrated therein is one explanatory embodiment of a medical kit. A catheter assembly comprises a Foley catheter 701, its operatively coupled coiled tubing 702, and its operatively coupled fluid drain bag 703. As shown in FIG. 7, the coiled tubing 702 is coupled between the Foley catheter 701 and the fluid drain bag 703.

A clip or other hanger 704 can be coupled to the fluid drain bag 703 so that the fluid drain bag 703 can be coupled to a stand, bedrail, or other object. The coiled tubing 702 may be coupled to the Foley catheter 701, and the fluid drain bag 703 coupled to the coiled tubing 702, before the assembly is placed in the tray 100. Alternatively, the Foley catheter 701, the coiled tubing 702, and the fluid drain bag 703 can be separately stored in a tray, with each being coupled together once the tray is opened.

The Foley catheter 701 includes a specimen sampling port 705, which is operatively coupled to the coiled tubing 702. Urine samples can be obtained from the specimen sampling port 705. The Foley catheter 701 can optionally include an inflation port as well (not shown). A syringe containing sterile water or other fluid can be coupled to the inflation port. The sterile water or other fluid can be injected into the inflation port so that the balloon of the Foley catheter 701 can be inflated.

The Foley catheter 701 is suitable for insertion into the urethra of a patient. The Foley catheter 701 is an elongated, flexible device. The Foley catheter 701 can be manufactured from flexible material such as polymers, elastomers, flexible steel, or other materials. Other materials suitable for manufacturing the Foley catheter 701 will be obvious to those of ordinary skill in the art.

The Foley catheter 701 includes an insertion end and a second end, which is coupled to the coiled tubing 702. A central lumen passes through the Foley catheter 701 so that fluids may pass from the insertion end to the second end, through the operatively coupled coiled tubing 702, and into the fluid drain bag 703.

When inserted into a patient, an inflatable retaining balloon (not shown) operatively coupled to the Foley catheter 701 can be inflated using the inflation port to retain the Foley catheter 701 within the patient. The balloon can be inflated with sterile water to retain the insertion end of the Foley catheter 701 within the patient's bladder.

FIG. 7 illustrated the tray 100 of FIGS. 1-6 having the catheter assembly 700, syringes 706, 707, and a specimen container 708 stored therein as a catheter packaging system. The illustrative catheter packaging system of FIG. 7 includes a tray 100 having a first compartment 101, a second compartment 102, and a third compartment 103.

The first compartment 101 is configured to accommodate syringes 706, 707. The second compartment 102 is configured to accommodate a coiled medical device, such as catheter assembly 700. The third compartment 103 is configured to accommodate the specimen container 708. The third compartment 103 can accommodate other materials as well, including skin sanitizers 709 and cleansing liquids, solutions, or gels. Additional devices corresponding to Foley catheter use, including towels 710, drapes 711, rubber gloves 712, one or more swab sticks 713, a Foley catheter securement device 714, and a Foley catheter insertion tag 715, which is a dated and/or time stamped label that is secured to the catheter tubing once the Foley catheter 701 is inserted, and so forth, can be disposed in the tray 100 as well. As an illustration of this flexibility, one or more towels can be disposed beneath the catheter assembly.

Syringes 706, 707 are disposed in the first compartment 101. One syringe 706 contains a sterile liquid, such as sterile water. The other syringe 707 contains a lubricant, such as lubricating jelly. The lubricating jelly can be discharged into the first compartment 101 to lubricate at least a portion of the Foley catheter 701 when the Foley catheter 701 is passed from the second compartment 102 into the first compartment 101.

Once the necessary components are disposed within the tray 100, the tray 100 can be sealed with a wrap to keep the internal components sterile. The wrap can be any of a number of types of material. The wrap can be a central sterile reprocessing (CSR) wrap that is used widely by medical professionals in hospitals, ambulatory surgical centers, and the like during medical procedures. While a CSR wrap is one example of a wrap that can be used, other wraps, such as plastic, cotton, linen, paper, or combinations thereof, can be substituted for the CSR wrap.

The CSR wrap can be folded about the tray 100 for sealing and can be correspondingly unfolded to reveal the tray 100. Once unfolded, the CSR wrap can then be used in the catheter insertion process. For example, an unfolded CSR wrap can be used to provide a sterile field in which the tray 100 sits for unloading and subsequent use.

Printed instructions can then be attached to, disposed upon, or disposed within the tray 100. The printed instructions can include a health care services portion and a patient portion. The health care services portion can include instructions telling the health care services provider, for example, how to set up a sterile or otherwise clean work environment, how to prepare the catheter assembly 700 disposed within the tray, how to use the other devices within the tray, how to insert the catheter, how to secure the drainage bag to the catheter, how to empty the drainage bag, how to obtain a urine sample, and so forth. The instructions can include pictures or illustrations showing visually how the various steps should be done as well.

The patient portion can include helpful suggestions or instructions for the patient. The patient portion can be detachably coupled to the health care services portion, such as by a perforated line that is easily torn to separate the patient portion from the health care services portion. Examples of suggestions or instructions that may be included in the patient portion include information on what a catheter is, what the patient should understand about the catheter, how to reduce the chance of getting an infection, information about infections commonly associated with catheters, symptoms of infections commonly associated with catheters, and suggestions for home use of the catheter assembly 700. The health care services portion may include an instruction for the health care services provider to detach the patient portion from the health care services portion and instructions to discuss the patient portion with the patient.

The health care services portion can tell the medical services provider how to perform a standard catheterization procedure. For instance, the tray 100 can be equipped with an adhesive label that can be used to identify the patient or specimen in the specimen container 903. Further, a label can be included to mark or otherwise identify the material in the fluid bag attached to the catheter. Such labels can include pre-printed fields, such as date, time and name. Further the printed instructions can notify the medical services provider that the devices disposed within the tray 100 are ordered corresponding to use during the catheterization procedure.

The printed instructions can inform the medical services provider of special instructions. For instance, the printed instructions can inform the medical services provider not to leave a catheter in a patient for more than forty-eight hours without a physician's approval. Where the printed instructions include such information, the labels included in the tray 100 may have pre-printed fields for the time of insertion that can be filled in by the medical services provider performing the catheterization procedure.

Once the printed instructions have been affixed to, or placed with, within, or atop the tray 100, the assembly can be sealed in a sterile wrap such as a thermally sealed bag. The thermally sealed bag can optionally include a preformed opening. For example, the opening can include one or more tabs that a health care services provider is instructed to pull to open the bag. Inclusion of a sterile wrap not only keeps the contents within the bag sterile, but also allows the instructions to be included with the tray assembly, yet outside the CSR wrap.

The printed instructions can be disposed atop the CSR wrap such that the health care services portion of the printed instructions is disposed on the top of the printed instructions, with the patient portion being disposed adjacent to the CSR wrap, such as when the printed instructions are configured as an accordion-style folded instruction pamphlet. While the printed instructions of can be configured as a folded, printed, separate article disposed atop the CSR wrap, rather than including separate printed instructions, the instructions for use can be printed on the CSR wrap as well.

Additional instruction materials may be included with the completed assembly as well. For example, an adhesive instruction tag can be affixed to the sterile wrap. The instruction tag may be adhered to an outer packaging that encloses the tray, the sterile wrap material, or both. For example, the instruction tag can include information regarding whether a catheter procedure is needed. Text such as "Is there a valid clinical reason?" may be included under an instruction to "Stop" that includes the following information:

Before inserting the Foley catheter, at least one of the following conditions should exist:
Acute urinary retention or obstruction
Precise measurement of urinary output needed
Select surgical procedures
Open sacral or perineal wounds in incontinent patient
Prolonged immobilization
End of life care Further, checklist text may be included, such as "Checklist for Foley Catheter Insertion" included under the word "Check" that includes the following information:

Check Each Box Upon Completion:
Obtain order from physician/provider
Document clinical reason for insertion
Explain procedure to patient
Use smallest catheter possible
Perform hand hygiene
Follow aseptic technique Additional information may also be included, such as a fillable form that provides fields for the date and time of insertion of the catheter to be recorded, the name of the health care services provider, and the signature of the health care services provider. The above text for the instruction tag is illustrative only and may be customized as desired by the manufacturer.

Figure 8:
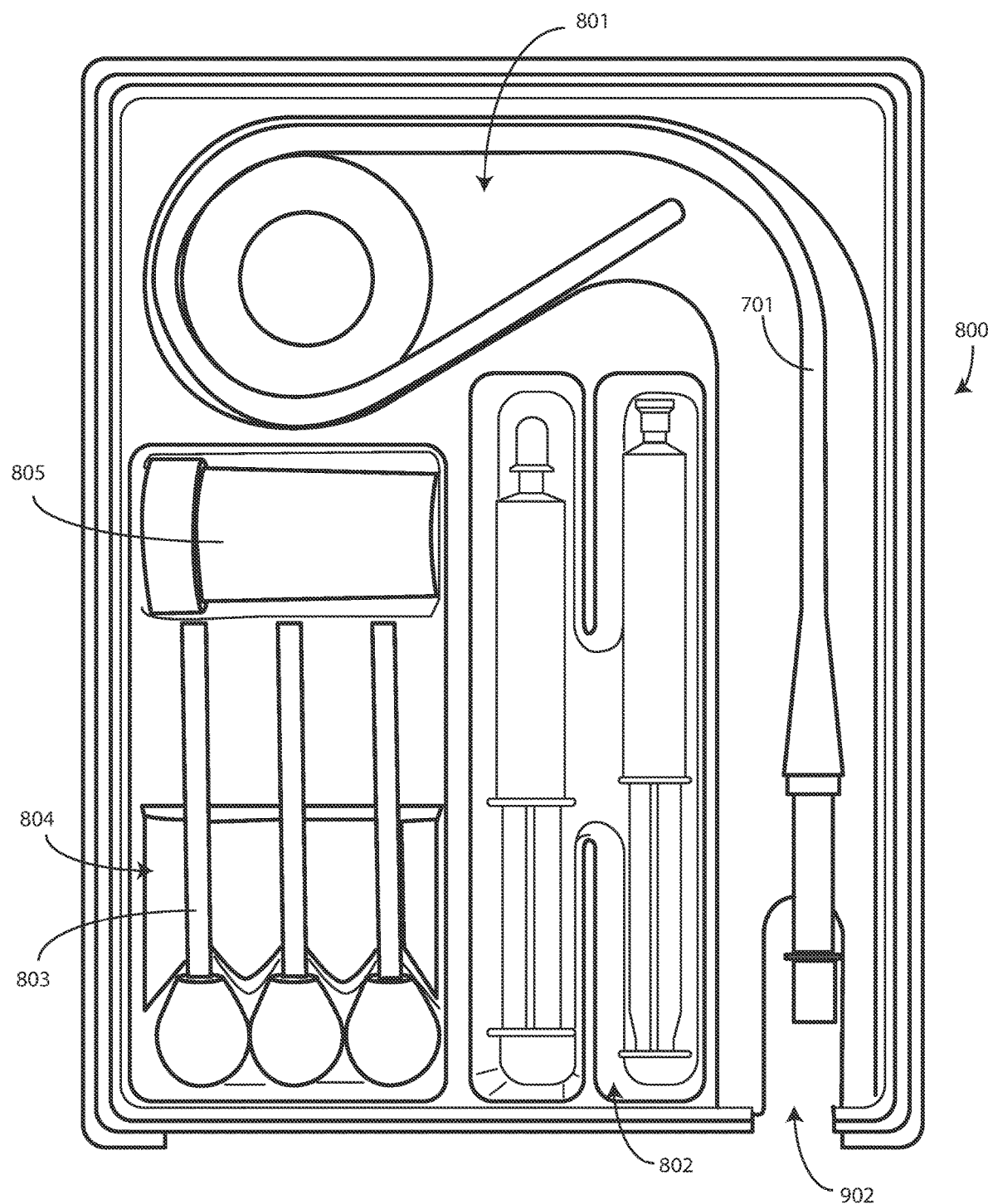
FIG. 8 illustrates a top plan view of another medical kit.

Turning now to FIG. 8, illustrated therein is another tray 800. This tray 800 is considered to be a "working tray" for a medical kit because it sits atop another tray known as a "storage tray" when the medical kit is configured in a two-layer, stacked configuration like that shown in FIG. 9.

The tray 800 houses a Foley catheter 701, while the storage tray that will be situated beneath tray 800 houses a drainage system including drainage tubing and a drainage receptacle, which could be any of a drainage bag and/or optionally including a urine meter. The tray 800 can include a number of preformed sections configured to respectively hold a number of components. For example, at least one section of the preformed sections of the tray 800 can include a catheter section 801 configured to hold the Foley catheter 701.

Figure 9:
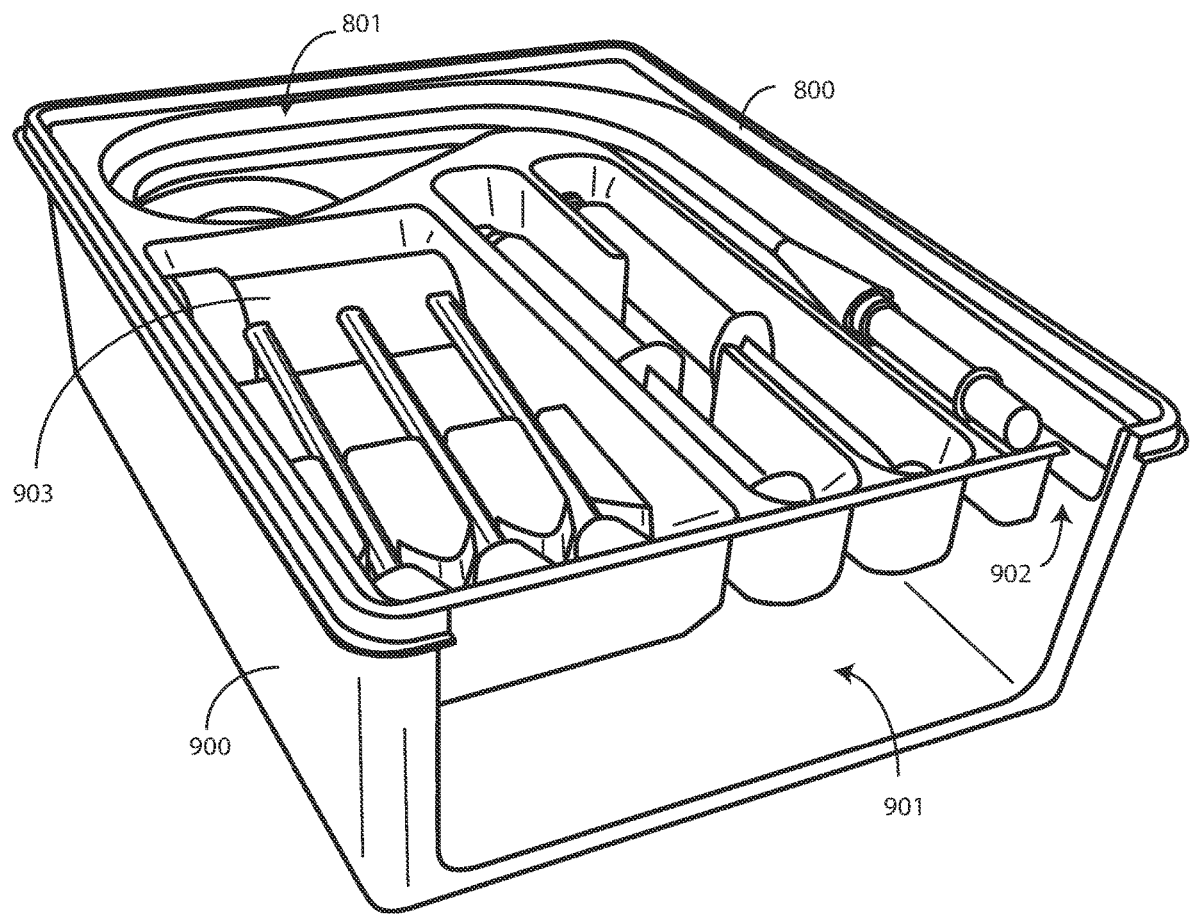
FIG. 9 illustrates a perspective view of the medical kit of FIG. 8.

An example of a medical kit including both a working tray and a storage tray in a stacked configuration is shown in FIG. 9. Turning to FIG. 9, the tray 800 can be configured to nest with the storage tray 900 by suspending the tray 800 from the storage tray 900. The storage tray 900 is manufactured from cardboard, which is generally incredibly flimsy. The storage tray 900 can include an opening 901 configured as a cutout in an end of the storage tray 900. The opening 901 in the end of the storage tray 900 can be configured to facilitate access to any of the components of the kit stored in the storage tray 900 while working from tray 800.

For example, until needed, and unless it collapses due to its flimsy cardboard construction, the drainage system can be stored in the storage tray 900 while working from the upper tray, i.e., tray 800. The opening 901 also allows access to a bottom of tray 800, if needed, to lift tray 800 out of the storage tray 900 by placing a hand in the opening against the bottom of tray 800, thereby completely destroying the sterile field. That said, tray 800 can be fixed (e.g., fastened, bonded, etc.) to the storage tray 900 instead. Where this is the case, tray 800 remains fixed to the storage tray 900 throughout a catheterization procedure, which makes it all but impossible to retrieve the majority of items stored within the storage tray 900. Indeed, and wholly copying the tray of FIGS. 1-6, instructions can be included along with step-by-step catheterization instructions imprinted directly on tray 800 telling you to not separate tray 800 from the storage tray 900 unless you just want a complete and utter mess.

As noted above, the storage tray 900 is frequently nothing more than a flimsy, folded, and utterly unstable paperboard storage tray. This subpar design can be constructed from an unfolded paperboard precursor. Once the paperboard precursor is folded along the requisite fold lines, the resulting storage tray 900 includes folded-over longitudinal edges configured to engage a number of protrusions molded into tray 800, thereby forming a portion of a fastening mechanism for fastening together tray 800 and the storage tray 900.

As shown in FIGS. 8-9, tray 800 can include a cutout 902 in a corner area of the catheter section 801 formed between a bottom portion and an end portion of the catheter section 801. The cutout 902 in the corner area of the catheter section 801 can be configured to allow, for example, the drainage tubing of the drainage system to pass from the storage tray 900 to tray 800 by way of a bottom of the cutout 902 when the drainage tubing is stored in the storage tray 900. A side of the cutout 902 in the corner area of the catheter section 801 can be configured to allow the drainage tubing to be removed from the storage tray 900 without disconnecting the drainage tubing from the Foley catheter 701 when the drainage system and the Foley catheter 701 are pre-connected in the kit.

Figure 10:
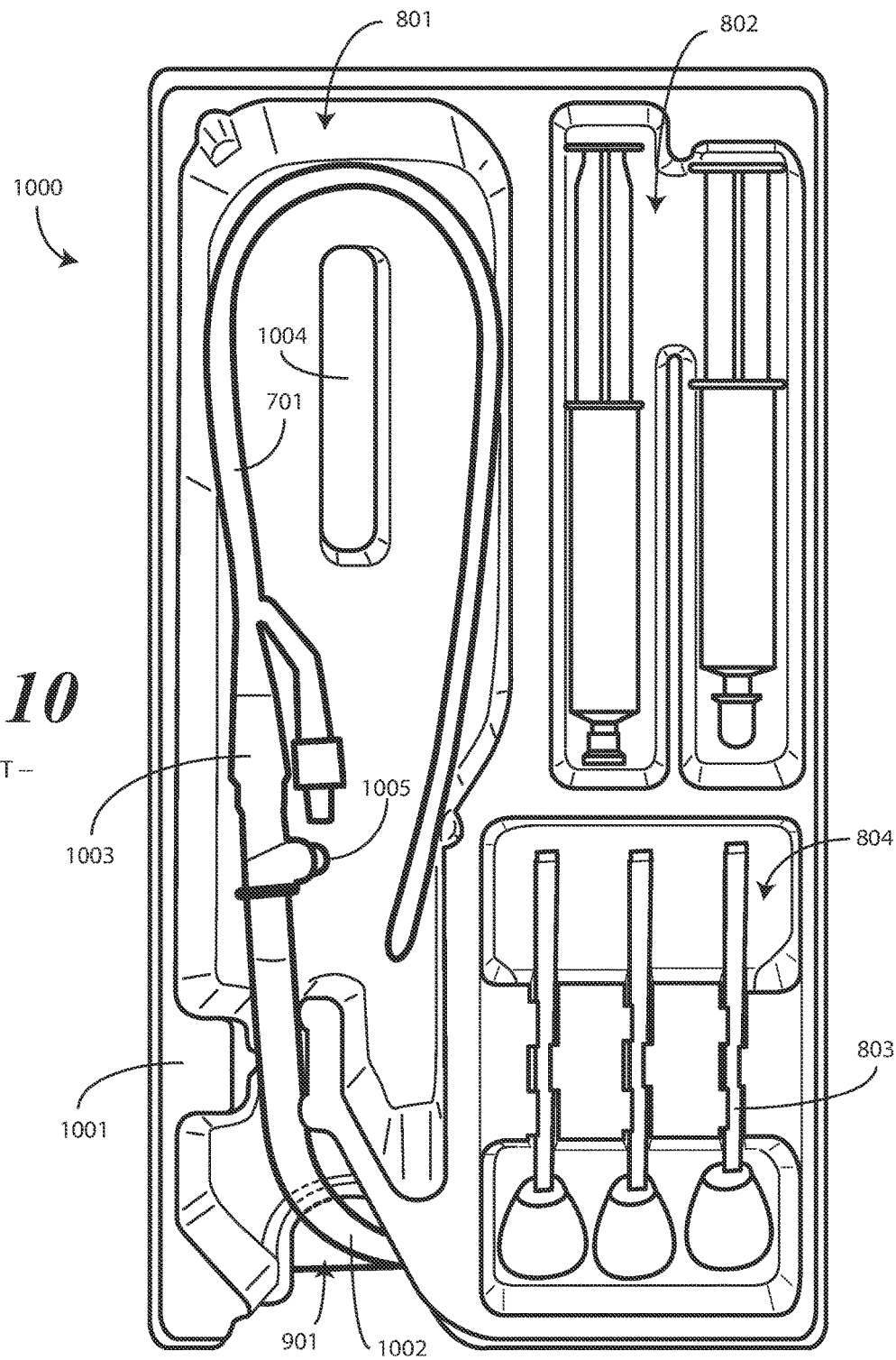
FIG. 10 illustrates a top plan view of still another medical kit.
Figure 12:
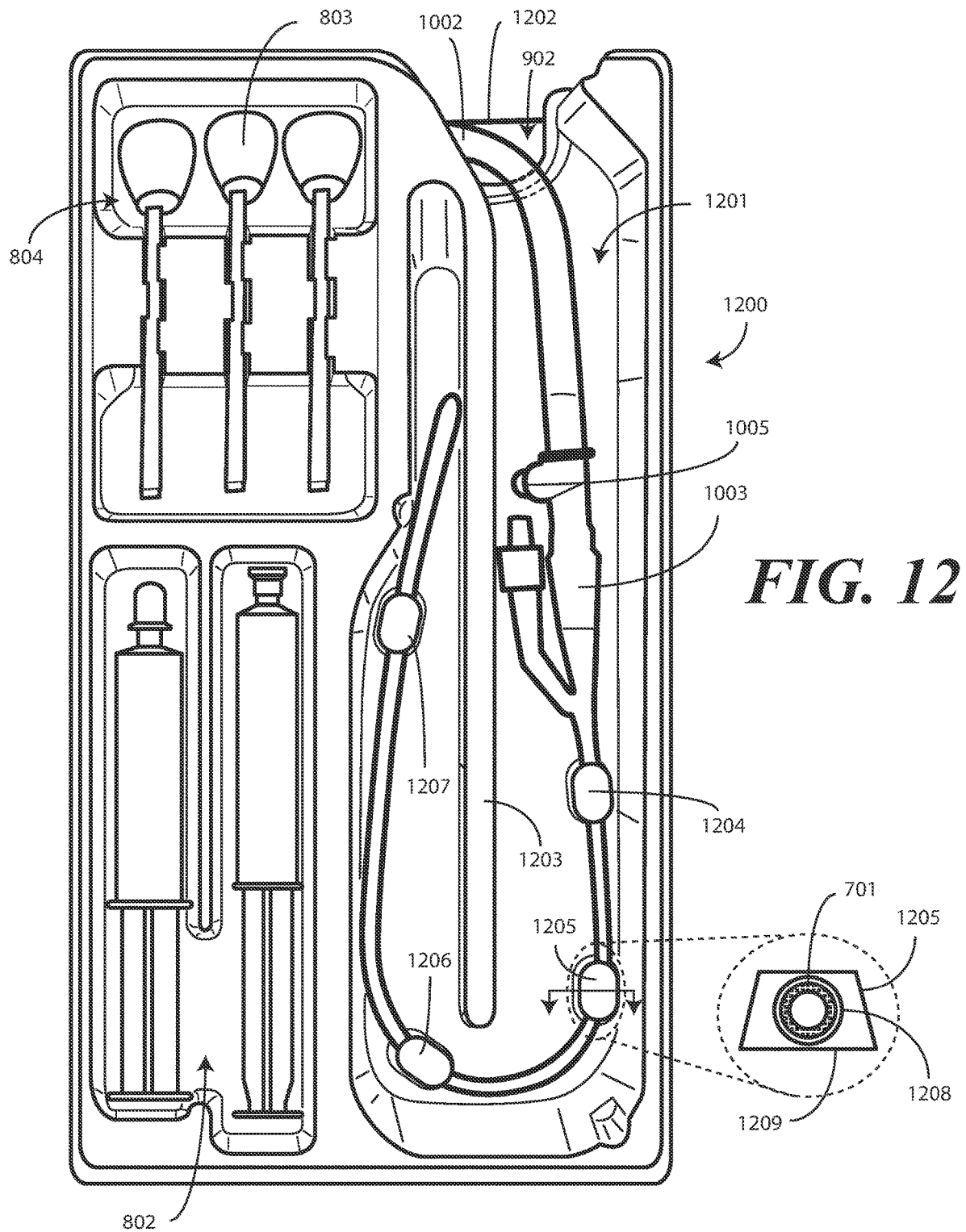
FIG. 12 illustrates a top plan view of a medical kit in accordance with one or more embodiments of the disclosure.

Turning now to FIG. 10, illustrated therein is another tray 1000 that is similar to tray 800 in that it can be situated atop a storage tray, as shown in FIG. 12. This tray 1000 includes a drainage-tubing constriction 1001 between the cutout 902 in the corner area of the catheter section 801. The drainage-tubing constriction 1001 can be configured to grip and hold a portion of the drainage tubing 1002 when the drainage system and the Foley catheter 701 are pre-connected.

By holding the drainage tubing 1002 in the drainage-tubing constriction 1001, an initial or as-manufactured placement of the Foley catheter 701 in the tray 800 can be maintained until the Foley catheter 701 is used for urinary catheterization. As shown, the drainage-tubing constriction 1001 can include snap-in tabs configured to really, really hold the drainage tubing 1002 in the drainage-tubing constriction 1001.

The Foley catheter 701 can be pre-connected to the drainage system. Between the Foley catheter 701 and the drainage tubing 1002, a connector 1003 can be used to connect the Foley catheter 701 and the drainage tubing 1002. The connector 1003 can include a urine-sampling port configured to facilitate urine sampling.

Referring collectively to FIGS. 8 and 10, the tray 800, 1000 can include a syringe compartment 802. Syringes can be placed in the syringe compartment 802. The syringe compartment 802 can be preformed to accommodate the syringes. However, the syringe compartment 802 does not conform to every feature of the syringes. For example, the syringe compartment 802 does not include a recess for a flange of the syringe. Instead, the syringe compartment 802 has a constant width or depth commensurate with at least the flange of the syringe to accommodate the syringes. The syringe compartment 802 can have a constant width or depth commensurate with the greatest width or diameter of the syringe.

The tray 800,1000 can also house one or more swab sticks 803. These swab sticks 803 can be placed in a swab stick compartment 804. The swab stick compartment 804 can include one or more angled channels to respectively hold the one or more swab sticks 803 with their corresponding one or more absorbent heads angled downward. As shown, the one or more angled channels can include snap-in tabs configured to hold the one or more swab sticks respectively in the one or more angled channels.

The tray can also include a specimen container 805. Tray 800 includes a specimen container 805, while tray 1000 does not. Where the tray 1000 fails to include a specimen container 805, the same will have to be placed in the storage tray (900) where it will have to be dug out amongst all the other medical implements stuffed therein. Configuring the storage tray (900) to hold the specimen container instead of tray 1000 minimizes a height of tray 1000 while greatly increasing both the difficulty of retrieving the specimen container 805 as well as increasing the chances of destroying the sterile field.

The tray 1000 of FIG. 10 includes an island barrier 1004 in the catheter section 801. As explained at paragraph [0066] of WO2019/246307, instructions should be placed within the catheter section 801 expressly or implicitly suggest dispensing lubricant from one of the syringes into the catheter section 801 for lubricating the Foley catheter 701. This feature is taken from the tray of FIGS. 1-6.

The problem with this island barrier is that dispensing lubricant into the catheter section 801 will totally gunk up both the connector 1003 and the urine sampling port 1005. This is true because the lubricant will pass between the island barrier 1004 and the drainage-tubing constriction 1001.

Figure 11:
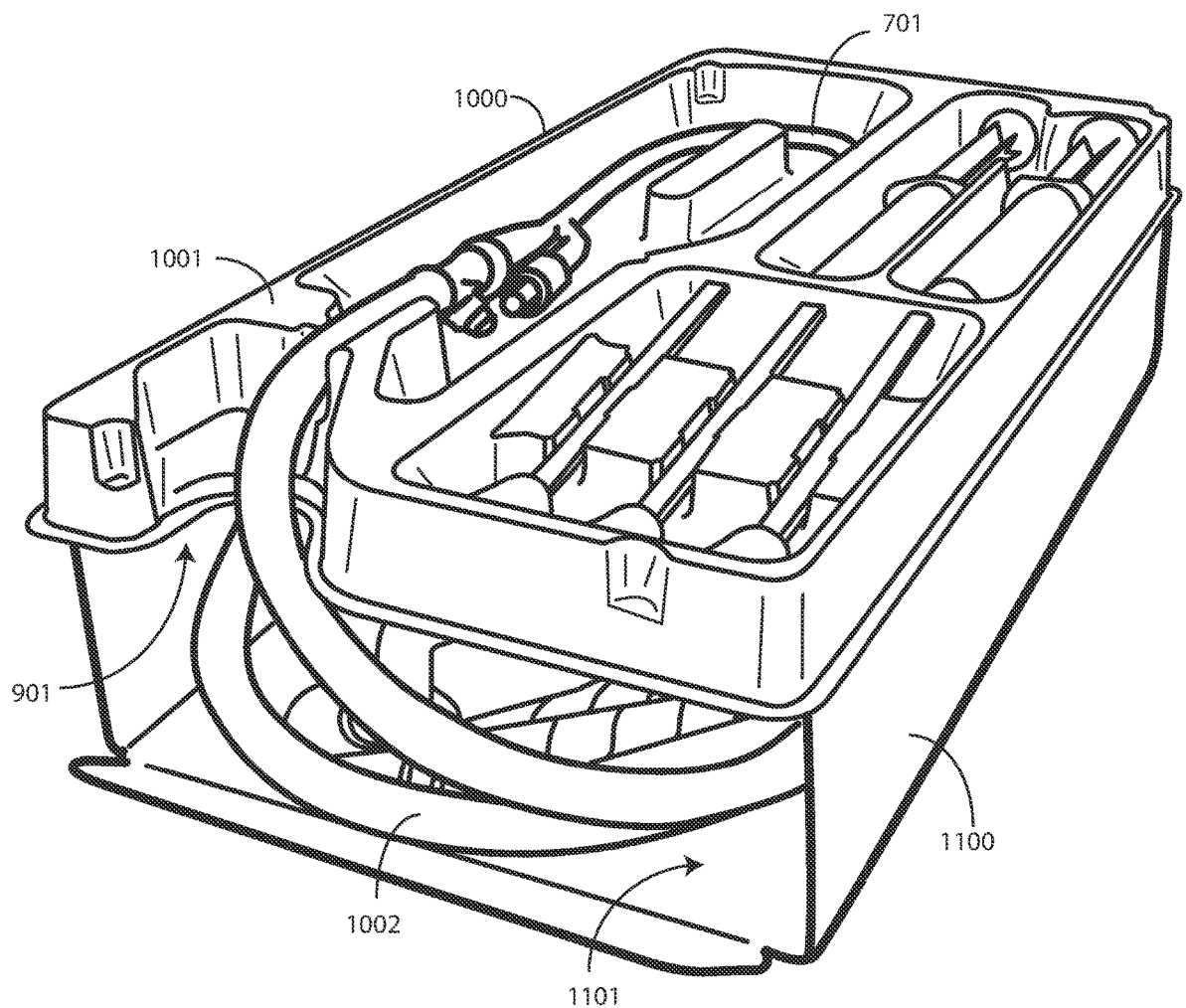
FIG. 11 illustrates a perspective view of the medical kit of FIG. 10.

Turning now to FIG. 11, illustrated therein is the tray 1000 of FIG. 10 positioned atop another flimsy, cardboard storage tray 1100. As shown, medical implements of all sorts are simply jammed into the storage tray 1100 with no rhyme or reason. Getting the Foley catheter 701 out of the tray 1000 without compromising the sterile field, especially when the drainage-tubing constriction 1001 has a death grip on the drainage tubing 1002, is all but impossible. Moreover, as noted above, the flimsy, cardboard storage tray 1100 is likely to collapse as well.

As before, the flimsy, cardboard storage tray 1100 includes an opening 1101 configured as a cutout in an end of the storage tray 1100. The opening 1101 in the flimsy, cardboard storage tray 1100 is on the same end of the kit formed by stacking tray 1000 atop tray 1100 as is the cutout of tray 1000. The opening 1101 in the end of the storage tray 1100 facilitates, but does not make easy, access to any of the components of the kit casually packed in the storage tray 1100 while working from tray 1000 as previously described.

Turning now to FIG. 12, illustrated therein is one explanatory kit comprising a tray 1200 and a storage tray 1202 configured in accordance with embodiments of the disclosure. The tray 1200 includes many features in common with the tray (1000) of FIG. 10. These features include a cutout 902 in a corner area of the catheter section 1201 formed between a bottom portion and an end portion of the catheter section 1201 that allows the drainage tubing 1002 of the drainage system to pass from the storage tray 1202 to tray 1200 by way of a bottom of the cutout 902 when the drainage tubing 1002 is stored in the storage tray 1200. The common features also include a Foley catheter 701 connected to the drainage system, as well as a connector 1003 situated between the Foley catheter 701 and the drainage tubing 1002 and a urine sampling port 1005 configured to facilitate urine sampling.

The tray 1200 also includes a syringe compartment 802. Syringes can be placed in the syringe compartment 802. The syringe compartment 802 is preformed to accommodate the syringes. The tray 1200 additionally houses one or more swab sticks 803, with the swab sticks 803 being placed in a swab stick compartment 804 that includes one or more angled channels to respectively hold the one or more swab sticks 803 with their corresponding one or more absorbent heads angled downward.

The tray 1200 of FIG. 12 differs from the tray (1000) in four critical respects: First, there is no drainage-tubing constriction (1001) between the cutout 902 in the corner area of the catheter section 1201 that is configured to hold a portion of the drainage tubing 1002 in the tray 1200. Second, the tray 1200 includes no island barrier (1004). Instead, it includes a big, beautiful bar, configured as a peninsular barrier 1203 that extends from an end of the tray 1200 to a distance exceeding seventy-five percent of the length of the catheter section 1201. Third, the tray 1200 includes a plurality of catheter retention devices 1204, 1205, 1206, 1207 that are each configured to retain a different portion of the Foley catheter 701 within the catheter section 1201. Finally, rather than being manufactured from flimsy cardboard, the storage tray 1202 of FIG. 12 is a rigid tray manufactured from a thermoplastic material.

As shown in FIG. 12, rather than including the drainage-tubing constriction (1001) between the cutout 902 in the corner area of the catheter section (801) with its death grip that makes removing the Foley catheter 701 from the catheter section, the tray 1200 of FIG. 12 includes a plurality of catheter retention devices 1204, 1205, 1206, 1207 each configured to retain a different portion of the Foley catheter 701 within the Foley catheter compartment defined by the catheter section 1201 of the tray. While four catheter retention devices 1204, 1205, 1206, 1207 are shown in FIG. 12, it should be noted that there could be more, or fewer, than four catheter retention devices 1204, 1205, 1206, 1207 in other embodiments.

In one or more embodiments, each catheter retention device 1204, 1205, 1206, 1207 is configured as a retaining device defining an aperture through which a portion of the Foley catheter 701 may pass. In this illustrative embodiment, each catheter retention device 1204, 1205, 1206, 1207 comprises a protrusion extending from a base 1209 of the tray 1200. Each protrusion defines an aperture 1208 into which the Foley catheter 701 inserts when the Foley catheter 701 is positioned within the Foley catheter compartment defined by the catheter section 1201 of the tray 1200.

Illustrating by example, in the sectional view of catheter retention device 1205, a polygonal retaining device defines an aperture 1208 through which a section of the Foley catheter 701 may pass when the Foley catheter 701 is initially loaded into the Foley catheter compartment defined by the catheter section 1201 of the tray 1200. As noted above, the Foley catheter 701 is a flexible device. Accordingly, when loading the Foley catheter 701 into the Foley catheter compartment defined by the catheter section 1201 of the tray 1200, the catheter portion passes through the aperture of each catheter retention device 1204, 1205, 1206, 1207 so as to wrap around the peninsular barrier 1203 into the configuration shown in FIG. 12.

To remove the Foley catheter 701, rather than having to wrestle, tug, and pull on the Foley catheter 701 and/or the drainage tubing 1002 to try and free the drainage tubing 1002 from the drainage-tubing constriction (1001), which could damage the Foley catheter 701 and/or compromise the sterile field, in the embodiment of FIG. 12 one simply pulls the connector 1003 toward the cutout 902 (toward the top of the page as viewed in FIG. 12) to slide the catheter portion through the apertures of each catheter retention device 1204, 1205, 1206, 1207. This provides a simple, quick, easy, and convenient way to release the Foley catheter 701 from the catheter section 1201 of the tray 1200.

While a retaining device defining an aperture 1208 completely encircling the portion of the Foley catheter 701 is one illustrative example of a catheter retention device, embodiments of the disclosure are not so limited. The catheter retention devices could also comprise retaining devices that partially encircle the portions of the Foley catheter 701. Alternatively, the catheter retention devices could comprise clips, clamps, clasps, braces, fasteners, catches, hooks, or other retention devices configured to retain the Foley catheter 701 within the catheter section 1201.

These catheter retention devices could be integrated into the tray 1200 as shown in FIG. 12 or could alternatively be configured as separate components that mechanically couple to the tray 1200 or a feature of the tray to retain the Foley catheter 701 within the catheter section 1201. Regardless of configuration, in one or more embodiments the tray 1200 includes one or more catheter retention devices, which can be configured as clamps, clips, or otherwise, and which hold the Foley catheter 701 better in place within the catheter section 1201 of the tray. In still other embodiments, the catheter retention devices define little arches through which the Foley catheter 701 may pass.

The idea behind the inclusion of catheter retention devices situated within the catheter section 1201 of the tray is that many nurses or other health care service providers will lift the tray 1200 off of the storage tray 1202 of the two-layer tray system. When they do, and when the drainage tubing 1002 is at least partially stowed within the storage tray 1202, the Foley catheter 701 will likely go all over the place, even when the drainage tubing 1002 is retained in the tray by a drainage-tubing constriction (1001). While the protrusions of the drainage-tubing constriction (1001) can apply a substantial grip to the drainage tubing 1002, they fail to prevent the drainage tubing 1002 from pivoting when the tray 1200 moves relative to the storage tray 1202.

Advantageously, the catheter retention devices retain different portions of the Foley catheter 701 itself, rather than the drainage tubing 1002, within the Foley catheter compartment defined by the catheter section 1201 of the tray 1200. Note that while these catheter retention devices are illustratively shown in the tray of FIG. 12, they could also be applied to any of the previously described trays if those trays were modified in accordance with embodiments of the disclosure.

Accordingly, as shown in FIG. 12 a medical procedure kit comprises a first tray, namely, storage tray 1202, and a second tray, namely, tray 1200, nested atop and suspended by the first tray. Tray 1200 defines a plurality of preformed compartments such as the catheter section 1201, the syringe compartment 802, and the swab stick compartment 804 configured to receive and house a plurality of medical implements such as the Foley catheter 701, the syringes, and the swab sticks 803. The Foley catheter 701 is positioned within a Foley catheter compartment defined by the catheter section 1201, while a drainage system is at least partially stowed within an interior of the storage tray 1202. The drainage system comprises at least a portion of drainage tubing 1002, which is coiled in this illustrative embodiment, and is coupled between the Foley catheter 701 and a fluid drain bag stowed within the storage tray 1202. Tray 1200 defines a plurality of catheter retention devices 1204, 1205, 1206, 1207 each configured to retain a different portion of the Foley catheter 701 within the Foley catheter compartment defined by the catheter section 1201 of the tray 1200.

Another distinction of the tray 1200 of FIG. 12 is the big, beautiful bar defined by the peninsular barrier 1203. As shown in FIG. 12, the peninsular barrier 1203 defines a barrier wall extending from an end of the Foley catheter compartment defined by the catheter section 1201 of the tray across a majority of the length of the Foley catheter compartment toward a distal end of the Foley catheter compartment.

In one or more embodiments, the peninsular barrier 1203 that extends from an end of the tray 1200 to a distance exceeding seventy-five percent of the length of the catheter section 1201. In this illustrative embodiment, the peninsular barrier 1203 extends across more than ninety percent of the length of the catheter section 1201. Advantageously, this allows the peninsular barrier 1203 to situate between the urine sampling port 1005 coupled to the connector 1003 connecting the Foley catheter 701 and the drainage tubing 1002 and at least some of the distal end of the Foley catheter 701. This advantageously prevents lubrication from gunking up the urine sampling port 1005 when lubricating jelly is dispensed from one of the syringes into the catheter section 1201.

Recall from the discussion of the tray (1000) of FIG. 10 that the island barrier (1004) allows dispensed lubricant into the catheter section (801) of that tray (1000) to totally gunk up both the connector 1003 and the urine sampling port 1005 due to the fact that the lubricant will pass between the island barrier (1004) and the drainage-tubing constriction (1001). The tray 1200 of FIG. 12 advantageously prevents this from occurring by omitting the island barrier, omitting the drainage-tubing constriction, adding the one or more catheter retention devices, and extending the peninsular barrier 1203 across a majority of the Foley catheter compartment defined by the catheter section 1201. Thus, while the Foley catheter 701 comprises a connector 1003 including a urine sampling port 1005, the barrier wall defined by the peninsular barrier 1203 advantageously situates between the urine sampling port 1005 and at least some of the distal end of the catheter portion of the Foley catheter 701, thereby preventing lubricant applied to the distal end of the catheter portion of the Foley catheter 701 from gunking up the urine sampling port 1005.

Yet another distinction offered by the kit of FIG. 12 is that the storage tray 1202 is not manufactured from flimsy cardboard. Instead, the storage tray 1202 comprises a rigid tray manufactured from a thermoplastic material.

In one or more embodiments, the storage tray 1202 is thermally formed on a mold from a thermoplastic, such as styrene or polystyrene. In another embodiment, the storage tray 1200 can be injection molded from a thermoplastic material such as ABS, polycarbonate, or polycarbonate-ABS, PMMA, PVC, or other polyamide-based thermoplastics. Other suitable materials for manufacturing the storage tray 1202 will be obvious to those of ordinary skill in the art having the benefit of this disclosure. In another embodiment, the storage tray 1200 can be poured on a mold using a quick setting plastic, epoxy, or resin. Other methods of manufacture will be obvious to those of ordinary skill in the art having the benefit of this disclosure.

By making the storage tray 1202 from a rigid, thermoplastic material rather than flimsy cardboard, the aforementioned collapsing problem is eliminated. Additionally, features can be incorporated into the storage tray 1202 such as rails and other attachment mechanisms that allow the upper tray to slide relative to a lower tray, and so forth. Other advantages of making the storage tray 1202 rigid from a thermoplastic material will be obvious to those of ordinary skill in the art having the benefit of this disclosure.

Figure 13:
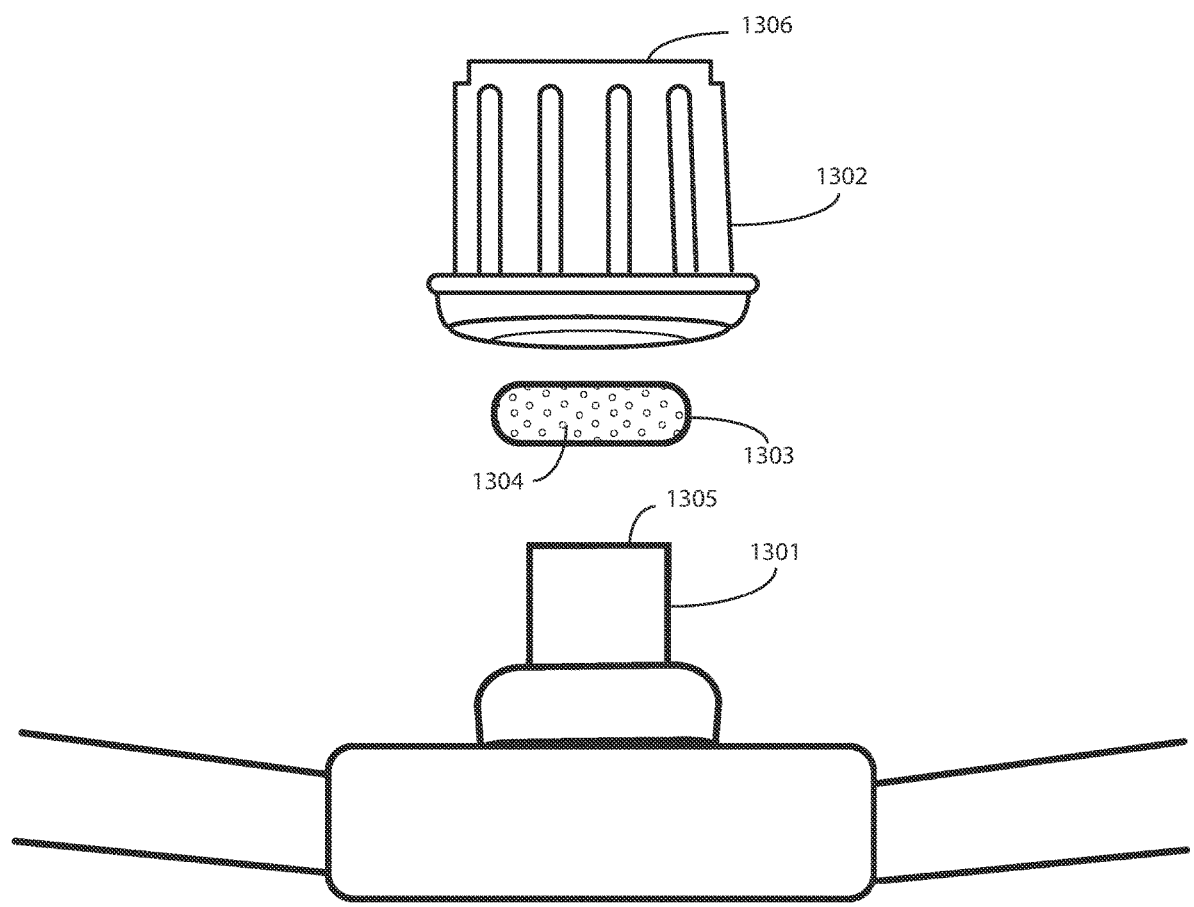
FIG. 13 illustrates one explanatory sampling port and cover assembly in accordance with one or more embodiments of the disclosure.

Turning now to FIG. 13, illustrated therein is a specimen sampling port 1301 and disinfectant cap 1302 configured in accordance with one or more embodiments of the disclosure. The specimen sampling port 1301 is coupled to a Foley catheter. The disinfectant cap 1302 is selectively attachable to, and detachable from, the specimen sampling port 1301.

In FIG. 13, the disinfectant cap 1302 is shown in an exploded view so that the interior component can be seen. In one or more embodiments, the disinfectant cap 1302 includes a fluid-retaining medium 1303 containing a bacteria-killing fluid 1304. While shown below the disinfectant cap 1302, when assembled the fluid-retaining medium 1303 situates within an interior of the disinfectant cap 1302.

In one or more embodiments, the fluid-retaining medium 1303 comprises a sponge that is situated within the interior of the disinfectant cap 1302. When the disinfectant cap 1302 attaches to the specimen sampling port 1301, the sponge situates between a distal end 1305 of the specimen sampling port 1301 and a major surface (the underside of top 1306) of the disinfectant cap 1302.

In one or more embodiments, the sponge is pre-saturated with the bacteria-killing fluid 1304, which functions as a disinfecting liquid. In one or more embodiments, the bacteria-killing fluid 1304 comprises a solution including at least seventy percent isopropyl alcohol. When coupled to a Foley catheter, the specimen sampling port 1301 functions as a urine sampling port, allowing a health care services provider to draw urine samples from through the Foley catheter system using the specimen sampling port 1301. Advantageously, attachment of the disinfectant cap 1302 to the specimen sampling port prevents to colonization of bacteria upon the latter, thereby reducing the chances for the initiation of a catheter associated urinary tract infection via the specimen sampling port 1301.

In one or more embodiments, the disinfectant cap 1302 covers, protects, and shields the portion of the specimen sampling port 1301 that includes the port itself. The interior surfaces of the disinfectant cap 1302 are configured to engage the exterior surfaces of the specimen sampling port 1301 to allow the disinfectant cap 1302 to remain selectively attached to the specimen sampling port 1301. As will be described below with reference to FIGS. 15-17, this selective attachment can be effected by a friction fit, a press fit, a threaded fit, an adhesive fit, a snap fit, or otherwise.

In one or more embodiments, the disinfectant cap 1302 includes an interior portion that is configured to received and selectively engage the exterior surfaces of the specimen sampling port 1301. The fluid-retaining medium 1303, after being wetted or saturated with the bacteria-killing fluid 1304, situates within the deepest portion of the interior of the disinfectant cap 1302. In one or more embodiments, such as when the fluid-retaining medium 1303 is a sponge, the fluid-retaining medium 1303 is compressible such that when the disinfectant cap 1302 is attached to the specimen sampling port 1301 the fluid-retaining medium 1303 compresses and covers the entirety of the distal end 1305 of the specimen sampling port 1301, thereby not only disinfecting the exterior surfaces of the specimen sampling port 1301 but also preventing bacteria from entering the Foley catheter coupled to the specimen sampling port 1301.

The disinfectant cap 1302 can optionally include one or more protrusions, hooks, spurs, or other retention features that extend distally from the interior of the disinfectant cap 1302 to retain the fluid-retaining medium 1303 within the interior of the disinfectant cap 1302. These retention features can further prevent the fluid-retaining medium 1303 from moving relative to the disinfectant cap 1302 when, for example, the disinfectant cap 1302 is twisted to apply the disinfectant cap 1302 to the specimen sampling port 1301. Compressing the fluid-retaining medium 1303 against the distal end 1305 of the specimen sampling port 1301 discharges some of the bacteria-killing fluid 1304 about the exterior surfaces of the specimen sampling port 1301 to disinfect the specimen sampling port 1301. In one or more embodiments, the fluid-retaining medium 1303 is not smooth, but is instead textured so that any motion occurring between the fluid-retaining medium 1303 and the distal end 1305 of the specimen sampling port 1301 removes any biota that is mechanically or otherwise attached to the exterior surfaces of the specimen sampling port 1301.

Figure 14:
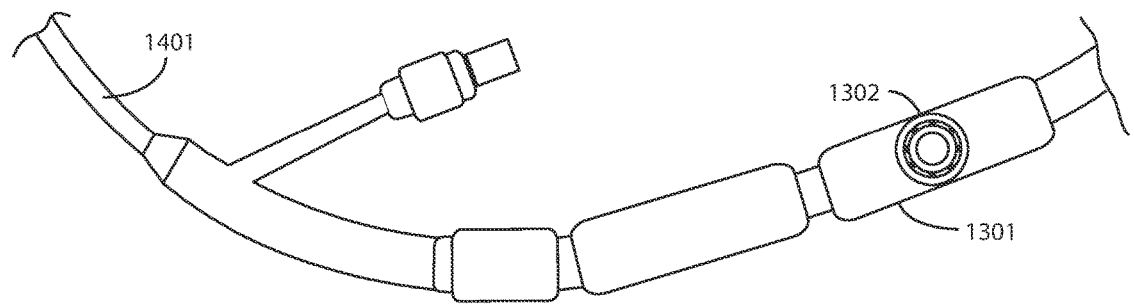
FIG. 14 illustrates one explanatory sampling port with a cover assembly attached thereto in accordance with one or more embodiments of the disclosure.

The disinfectant cap 1302 is shown attached to the specimen sampling port 1301, which is coupled to a Foley catheter 1401, in FIG. 14. Where the disinfectant cap 1302 is so attached, the disinfectant cap 1302 prevents bacteria from entering the Foley catheter 1401 through the specimen sampling port 1301, which functions as a urine sampling port in this configuration.

Figures 15, 16, 17:
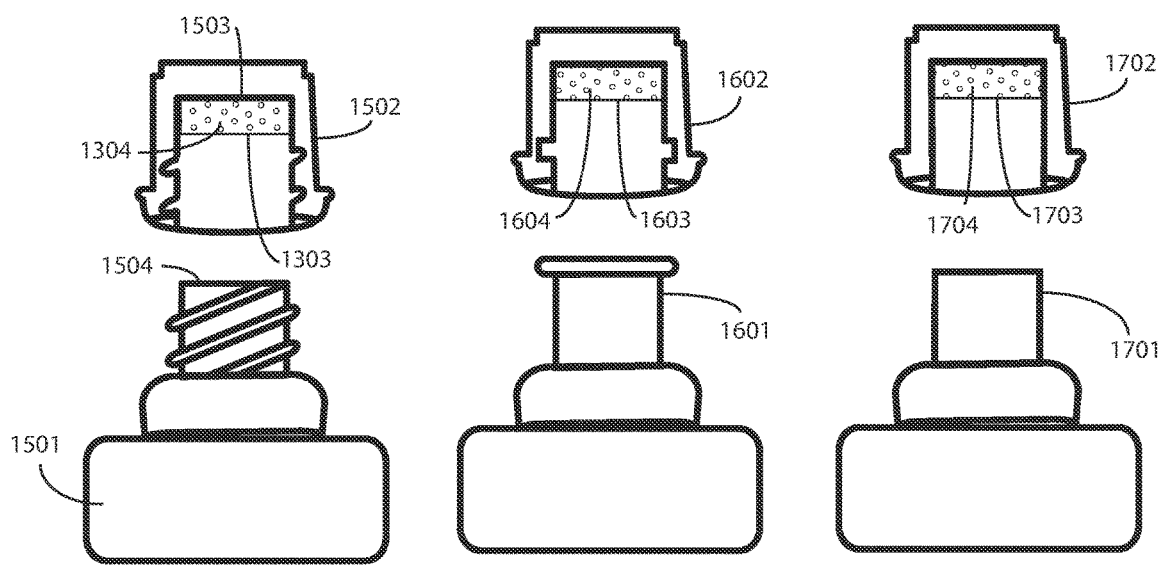
FIG. 15 illustrates another explanatory sampling port and cover assembly in accordance with one or more embodiments of the disclosure.
FIG. 16 illustrates still another explanatory sampling port and cover assembly in accordance with one or more embodiments of the disclosure.
FIG. 17 illustrates another explanatory sampling port and cover assembly in accordance with one or more embodiments of the disclosure.

Turning now to FIG. 15, illustrated therein is a sectional view of one explanatory disinfectant cap 1502 configured to attach to a urine sampling port 1501 in accordance with one or more embodiments of the disclosure. In FIG. 13, the disinfectant cap 1502 is configured to couple to the urine sampling port 1501 via a threaded connection.

As shown in this view, the fluid-retaining medium 1303, which is saturated with the bacteria-killing fluid 1304 in this illustration, situates against a major surface 1503 set deepest within the interior of the disinfectant cap 1502. In this illustrative embodiment, the fluid-retaining medium 1303 comprises a sponge and the bacteria-killing fluid 1304 comprises isopropyl alcohol. The fluid-retaining medium 1303 is shown in an uncompressed state in FIG. 15.

When the disinfectant cap 1502 is attached to the urine sampling port 1501 via the threaded connection, the major surface 1503 of the disinfectant cap 1502 applies a loading force to compress the fluid-retaining medium 1303 between the distal end 1504 of the urine sampling port 1501 and the major surface 1503 of the disinfectant cap 1502. This causes at least some of the bacteria-killing fluid 1304 to exude from the fluid-retaining medium 1303 and contact the exterior surfaces of the urine sampling port 1501. This kills bacteria, microorganisms, biofilms, and other microbes living on the exterior surfaces of the urine sampling port 1501.

The diameter of the interior of the disinfectant cap 1502 allows the disinfectant cap 1502 to pass along the exterior surfaces of the urine sampling port 1501 when the disinfectant cap 1502 is twisted such that the external threads of the urine sampling port 1501 engage the recessed thread grooves situated along the interior of the disinfectant cap 1502.

Turning now to FIG. 16, illustrated therein is another disinfectant cap 1602 configured to selectively attach to, and detach from, a urine sampling port 1601 in accordance with one or more embodiments of the disclosure. As with the disinfectant cap (1502) of FIG. 15, the disinfectant cap 1602 of FIG. 16 includes a sponge 1603 wetted by a solution 1604 comprising at least seventy-percent isopropyl alcohol situated within an interior of, and against an interior surface of, the disinfectant cap 1602.

In contrast to the threaded connection shown in FIG. 15, in FIG. 15 the engagement is a press fit where a tab of the urine sampling port 1601 engages a tab receiver configured as an annular recess positioned along the annular interior surface of the disinfectant cap 1602.

Turning now to FIG. 17, illustrated therein is yet another disinfectant cap 1702 configured to attach to a urine sampling port 1701 in accordance with one or more embodiments of the disclosure. As with the disinfectant cap (1602) of FIG. 16 and the disinfectant cap (1502) of FIG. 15, the disinfectant cap 1702 of FIG. 17 includes a fluid-retaining medium 1703 containing a bacteria-killing fluid 1704 situated within an interior of, and against an interior surface of, the disinfectant cap 1602. In one or more embodiments, the bacteria-killing fluid 1704 is a fluid solution comprising at least some isopropyl alcohol. In one or more embodiments, the fluid solution comprises at least seventy-percent isopropyl alcohol.

In contrast to the threaded connection shown in FIG. 15, and the tab-based press fit connection of FIG. 16, in FIG. 17 the engagement is a friction fit where the interior surfaces of the disinfectant cap 1702 frictionally retain the disinfectant cap 1702 to the exterior surfaces of the urine sampling port 1701.

Figure 18:
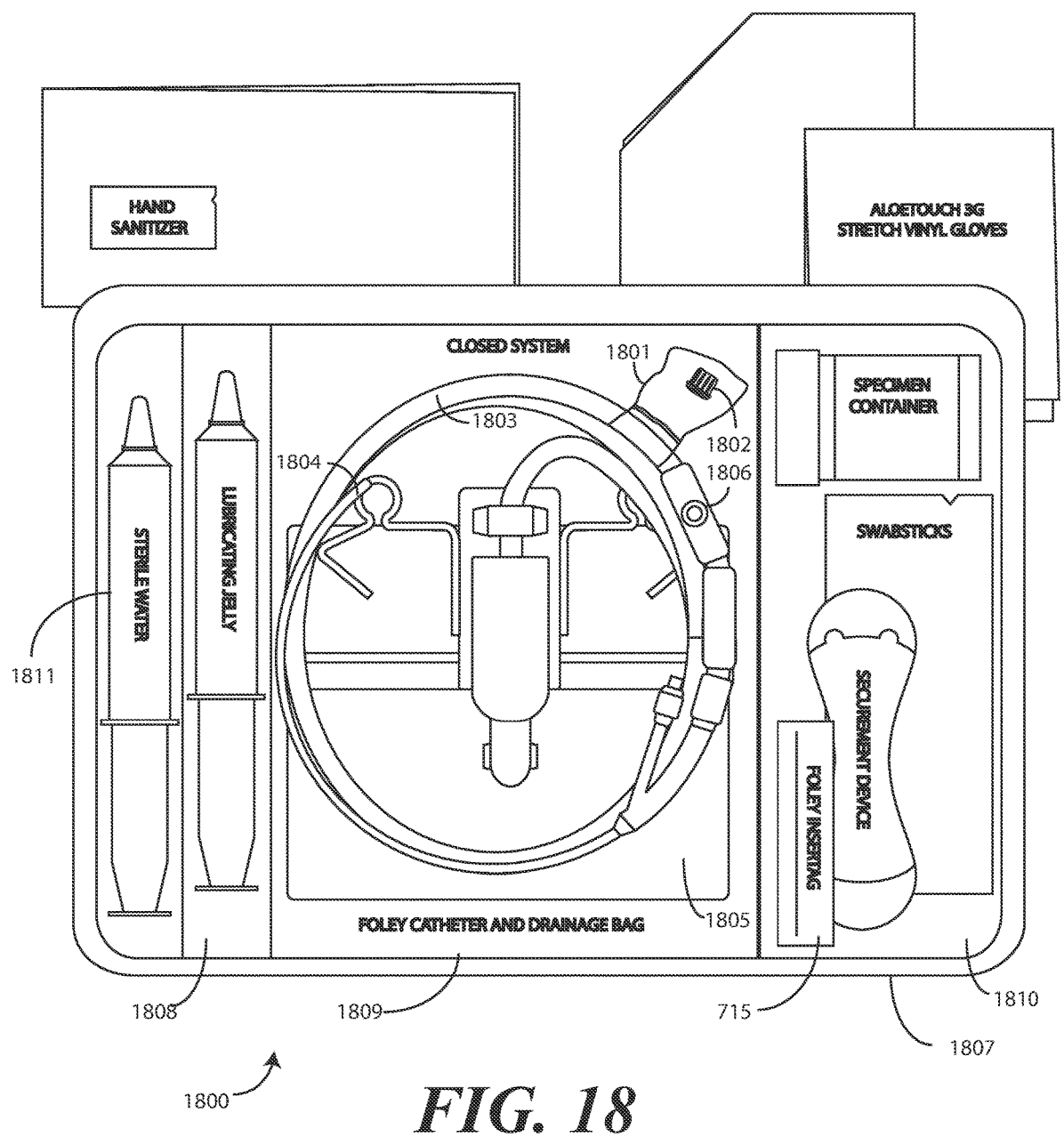
FIG. 18 illustrates one explanatory medical kit in accordance with one or more embodiments of the disclosure.

Turning now to FIG. 18, illustrated therein is one explanatory medical procedure kit 1800 configured in accordance with one or more embodiments of the disclosure. The medical procedure kit 1800 of FIG. 18 includes many of the components described above with reference to FIG. 7. Additionally, the medical procedure kit 1800 of FIG. 18 includes a container 1801 within which a disinfectant cap 1802 configured in accordance with embodiments of the disclosure is situated within the medical procedure kit 1800. In this illustrative embodiment, the container 1801 comprises a plastic bag that is attached to the coiled tubing 1803 coupling the Foley catheter 1804 and a fluid drain bag 1805. This allows a health care services provider to easily see and find the disinfectant cap 1802, as well as to understand that the disinfectant cap 1802 is to be used to cover the specimen sampling port 1806 coupled to the Foley catheter 1804.

In one or more embodiments, the disinfectant cap 1802 is sterilized prior to being positioned within the container 1801, which encapsulates the disinfectant cap 1802 by completely covering the disinfectant cap 1802. The container 1801 can be sterilized as well. The container can include labels, instructions, and/or diagrams depicting how to use the disinfectant cap 1802 in one or more embodiments.

Accordingly, as shown in FIG. 18, the medical procedure kit 1800 includes a single-layer tray 1807 comprising a first compartment 1808 at least partially bounded by a first base member, a second compartment 1809 at least partially bounded by a second base member, and a third compartment 1810 at least partially bounded by a third base member. At least one syringe 1811 is situated within the first compartment 1808. The Foley catheter 1804, the coiled tubing 1803, and the fluid drain bag 1805 are all disposed within the second compartment 1809. The disinfectant cap 1802 is also situated within the second compartment 1809. In particular, the disinfectant cap 1802 is positioned within a container 1801 that is attached to the coiled tubing 1803.

Figure 19:
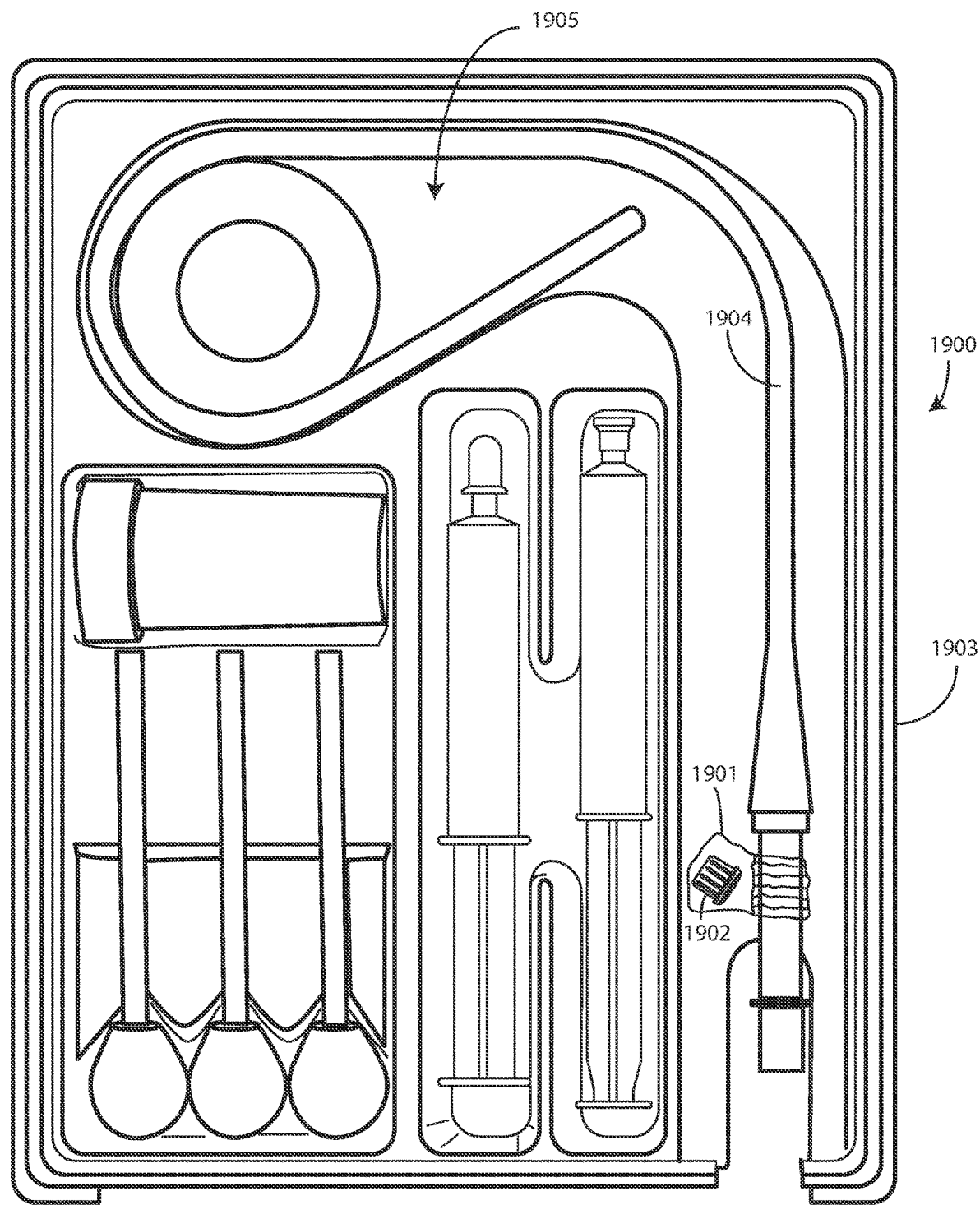
FIG. 19 illustrates another explanatory medical kit in accordance with one or more embodiments of the disclosure.

Turning now to FIG. 19, illustrated therein is another explanatory medical procedure kit 1900 configured in accordance with one or more embodiments of the disclosure. The medical procedure kit 1900 of FIG. 19 includes many of the components described above with reference to FIG. 8. Additionally, the medical procedure kit 1900 of FIG. 19 includes a container 1901 within which a disinfectant cap 1902 configured in accordance with embodiments of the disclosure is situated within the medical procedure kit 1900. In this illustrative embodiment, the container 1901 comprises a plastic bag that is attached to the Foley catheter 1904. This allows a health care services provider to easily see and find the disinfectant cap 1902.

In one or more embodiments, the disinfectant cap 1902 is sterilized prior to being positioned within the container 1901, which encapsulates the disinfectant cap 1902 by completely covering the disinfectant cap 1902. The container 1901 can be sterilized as well. The container can include labels, instructions, and/or diagrams depicting how to use the disinfectant cap 1902 in one or more embodiments.

Accordingly, as shown in FIG. 19, the medical procedure kit 1900 includes a working tray 1903 that sits atop another tray known as a "storage tray" when the medical procedure kit 1900 is configured in a two-layer, stacked configuration like that shown above in FIG. 9. The working tray 1903 houses the Foley catheter 1904 to which the container 1901 enclosing the disinfectant cap 1902 is attached, while the storage tray that will be situated beneath working tray 1903 houses a drainage system including drainage tubing and a drainage receptacle, which could be any of a drainage bag and/or optionally including a urine meter. In this example, the working tray 1903 includes one or more preformed sections, with the Foley catheter 1904 and the container 1901 enclosing the disinfectant cap 1902 situated within a catheter section 1905 of the preformed sections.

In one or more embodiments, the working tray 1903 is configured to nest with the storage tray by suspending the working tray 1903 from the storage tray. The storage tray can include an opening configured as a cutout in an end of the storage tray. The opening in the end of the storage tray can be configured to facilitate access to any of the components of the kit stored in the storage tray while working from the working tray 1903.

Figure 20:
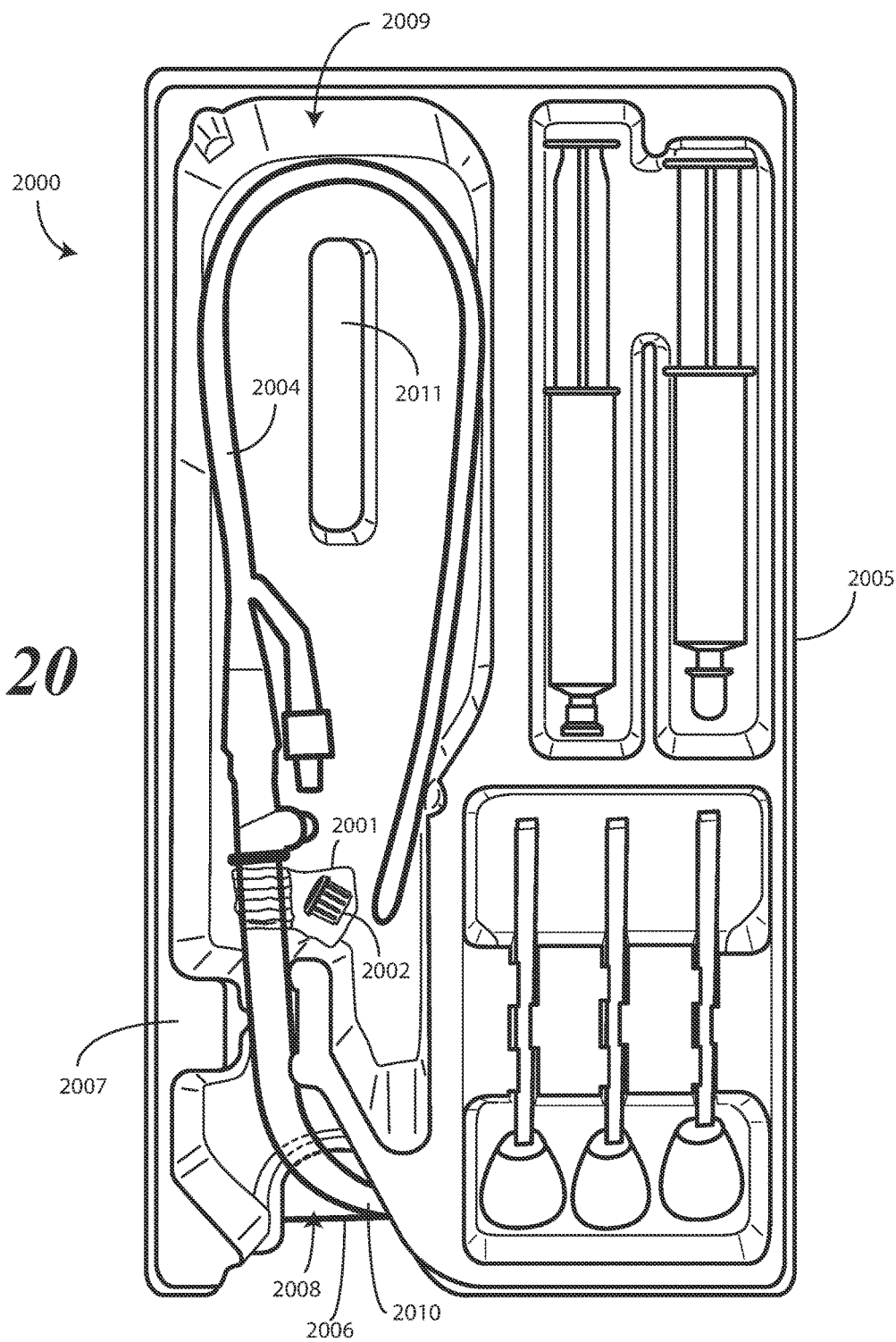
FIG. 20 illustrates still another explanatory medical kit in accordance with one or more embodiments of the disclosure.

Turning now to FIG. 20, illustrated therein is another explanatory medical procedure kit 2000 configured in accordance with one or more embodiments of the disclosure. The medical procedure kit 2000 of FIG. 20 includes many of the components described above with reference to FIG. 10. Additionally, the medical procedure kit 2000 of FIG. 20 includes a container 2001 within which a disinfectant cap 2002 configured in accordance with embodiments of the disclosure is situated within the medical procedure kit 2000. In this illustrative embodiment, the container 2001 comprises a plastic bag that is attached to the Foley catheter 2004. This allows a health care services provider to easily see and find the disinfectant cap 2002.

In one or more embodiments, the disinfectant cap 2002 is sterilized prior to being positioned within the container 2001, which encapsulates the disinfectant cap 2002 by completely covering the disinfectant cap 2002. The container 2001 can be sterilized as well. The container can include labels, instructions, and/or diagrams depicting how to use the disinfectant cap 2002 in one or more embodiments.

Accordingly, as shown in FIG. 20, a working tray 2005 is situated atop a storage tray 2006. The working tray 2005 includes a drainage-tubing constriction 2007 between the cutout 2008 in the corner area of the catheter section 2009. The drainage-tubing constriction 2007 grips and holds a portion of the drainage tubing 2010 when the drainage system and the Foley catheter 2004 are pre-connected.

The working tray 2005 of FIG. 20 includes an island barrier 2011 in the catheter section 2009. The working tray 2005 houses the Foley catheter 2004 to which the container 2001 enclosing the disinfectant cap 2002 is attached, while the storage tray 2006 situated beneath working tray 2005 houses a drainage system including drainage tubing 2010 and a drainage receptacle.

Figure 21:
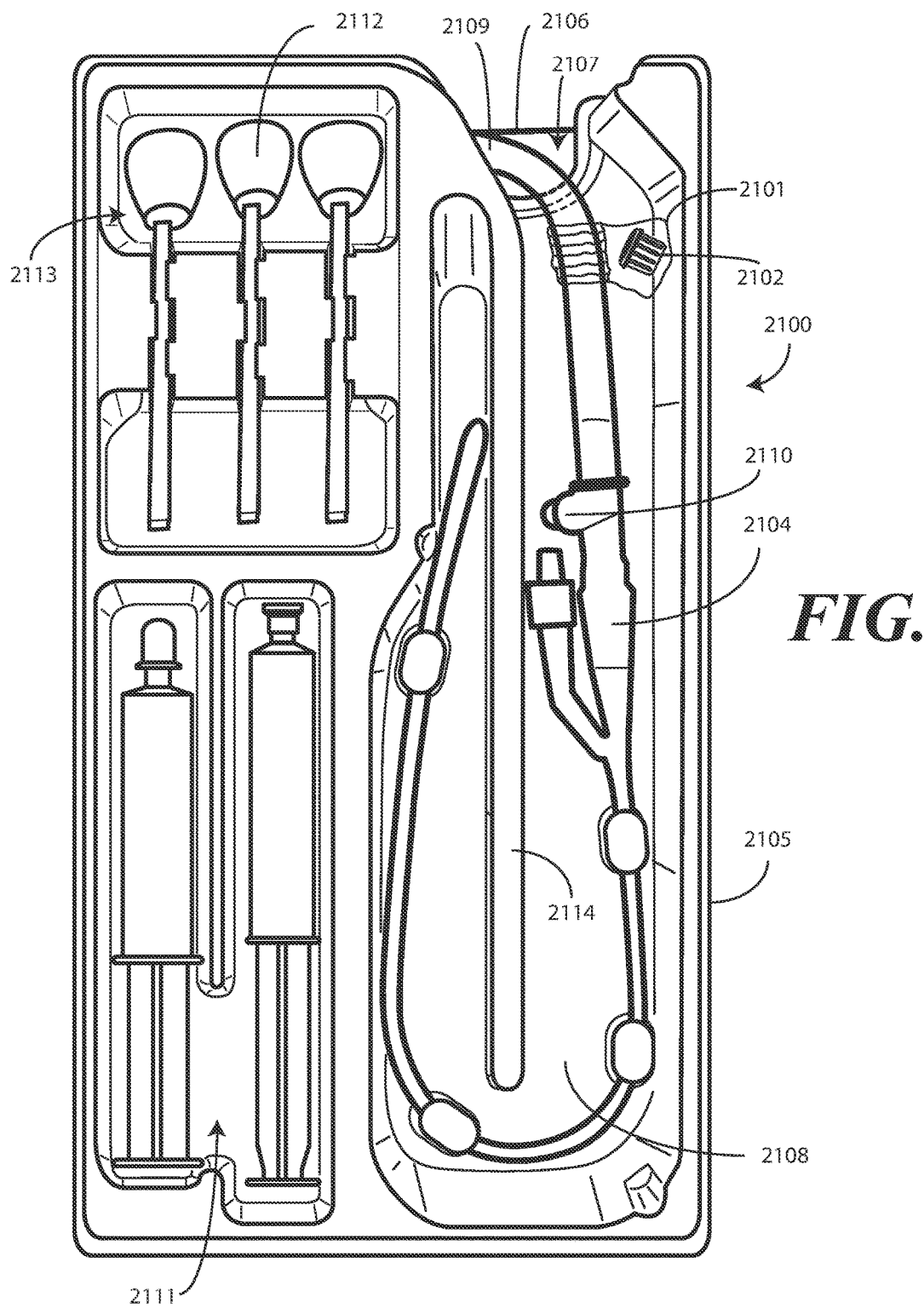
FIG. 21 illustrates yet another explanatory medical kit in accordance with one or more embodiments of the disclosure.

Turning now to FIG. 21, illustrated therein is another explanatory medical procedure kit 2100 configured in accordance with one or more embodiments of the disclosure. The medical procedure kit 2100 of FIG. 21 includes many of the components described above with reference to FIG. 12. Additionally, the medical procedure kit 2100 of FIG. 21 includes a container 2101 within which a disinfectant cap 2102 configured in accordance with embodiments of the disclosure is situated within the medical procedure kit 2100. In this illustrative embodiment, the container 2101 comprises a plastic bag that is attached to the Foley catheter 2104. This allows a health care services provider to easily see and find the disinfectant cap 2102.

As before, the disinfectant cap 2102 can be sterilized prior to being positioned within the container 2101, which encapsulates the disinfectant cap 2102 by completely covering the disinfectant cap 2102. The container 2101 can be sterilized as well. The container can include labels, instructions, and/or diagrams depicting how to use the disinfectant cap 2102 in one or more embodiments.

Accordingly, as shown in FIG. 21, the medical procedure kit 2100 includes an upper tray 2105 and a lower tray 2106. The upper tray 2105 includes a cutout 2107 in a corner area of the catheter section 2108 formed between a bottom portion and an end portion of the catheter section 2108 that allows the drainage tubing 2109 of the drainage system to pass from the lower tray 2106 to the upper tray 2105 by way of a bottom of the cutout 2107 when the drainage tubing 2109 is stored in the lower tray 2106. As shown in FIG. 21, the Foley catheter 2104 is connected to the drainage system. The Foley catheter 2104 is coupled to both the drainage tubing 2109 and the urine sampling port 2110 configured to facilitate urine sampling.

The upper tray 2105 also includes a syringe compartment 2111. Syringes can be placed in the syringe compartment 2111. The syringe compartment 2111 is preformed to accommodate the syringes. The upper tray 2105 additionally houses one or more swab sticks 2112, with the swab sticks 2112 being placed in a swab stick compartment 2113 that includes one or more angled channels to respectively hold the one or more swab sticks 2112 with their corresponding one or more absorbent heads angled downward.

The upper tray 2105 does not include any drainage-tubing constriction between the cutout 2107 in the corner area of the catheter section 2108. The upper tray 2105 includes no island barrier either. Instead, it includes a big, beautiful bar, configured as a peninsular barrier 2114 that extends from an end of the medical procedure kit 2100 to a distance exceeding seventy-five percent of the length of the catheter section 2108. The upper tray 2105 does include a plurality of catheter retention devices that are each configured to retain a different portion of the Foley catheter 2104 within the catheter section 2108. Additionally, the lower tray 2106 is a rigid tray manufactured from a thermoplastic material.

Since there is no drainage-tubing constriction between the cutout 2107 in the corner area of the catheter section 2108 with its death grip that makes removing the Foley catheter 2104 from the catheter section 2108, the upper tray 2105 instead includes a plurality of catheter retention devices each configured to retain a different portion of the Foley catheter 2104 within the Foley catheter compartment defined by the catheter section 2108 of the upper tray 2105. To remove the Foley catheter 2104, rather than having to wrestle, tug, and pull on the Foley catheter 2104 and/or the drainage tubing 2109 to try and free the drainage tubing 2109 from the drainage-tubing constriction, which could damage the Foley catheter 2104 and/or compromise the sterile field, one simply pulls the base of the Foley catheter 2104 toward the cutout 2107 to slide the catheter portion through the apertures of each catheter retention device. This provides a simple, quick, easy, and convenient way to release the Foley catheter 2104 from the catheter section 2108 of the upper tray 2105.

While a retaining device defining an aperture completely encircling the portion of the Foley catheter 2104 is one illustrative example of a catheter retention device, embodiments of the disclosure are not so limited. The catheter retention devices could also comprise retaining devices that partially encircle the portions of the Foley catheter 2104. Alternatively, the catheter retention devices could comprise clips, clamps, clasps, braces, fasteners, catches, hooks, or other retention devices configured to retain the Foley catheter 2104 within the catheter section 2108.

As shown in FIG. 21, the container 2101 is attached to the drainage tubing 2109. However, in other embodiments, the disinfectant cap 2102 can simply be coupled to the urine sampling port 2110 directly as shown above in FIG. 14. While the inclusion of the peninsular barrier 2114 that extends from an end of the upper tray 2105 to a distance exceeding seventy-five percent of the length of the catheter section 2108 prevents lubrication from gunking up the urine sampling port 2110 when lubricating jelly is dispensed from one of the syringes into the catheter section 2108, the direct coupling of the disinfectant cap 2102 to the urine sampling port 2110 would further prevent this gunking as well. To be sure, a first disinfectant cap could be coupled to the urine sampling port 2110 while a container 2101 housing another replacement disinfectant cap could be coupled to the drainage tubing 2109. The same configuration could be applied to either of the medical procedure kits of FIGS. 19-20 since they suffer from the gunking issue described above.

Figure 22:
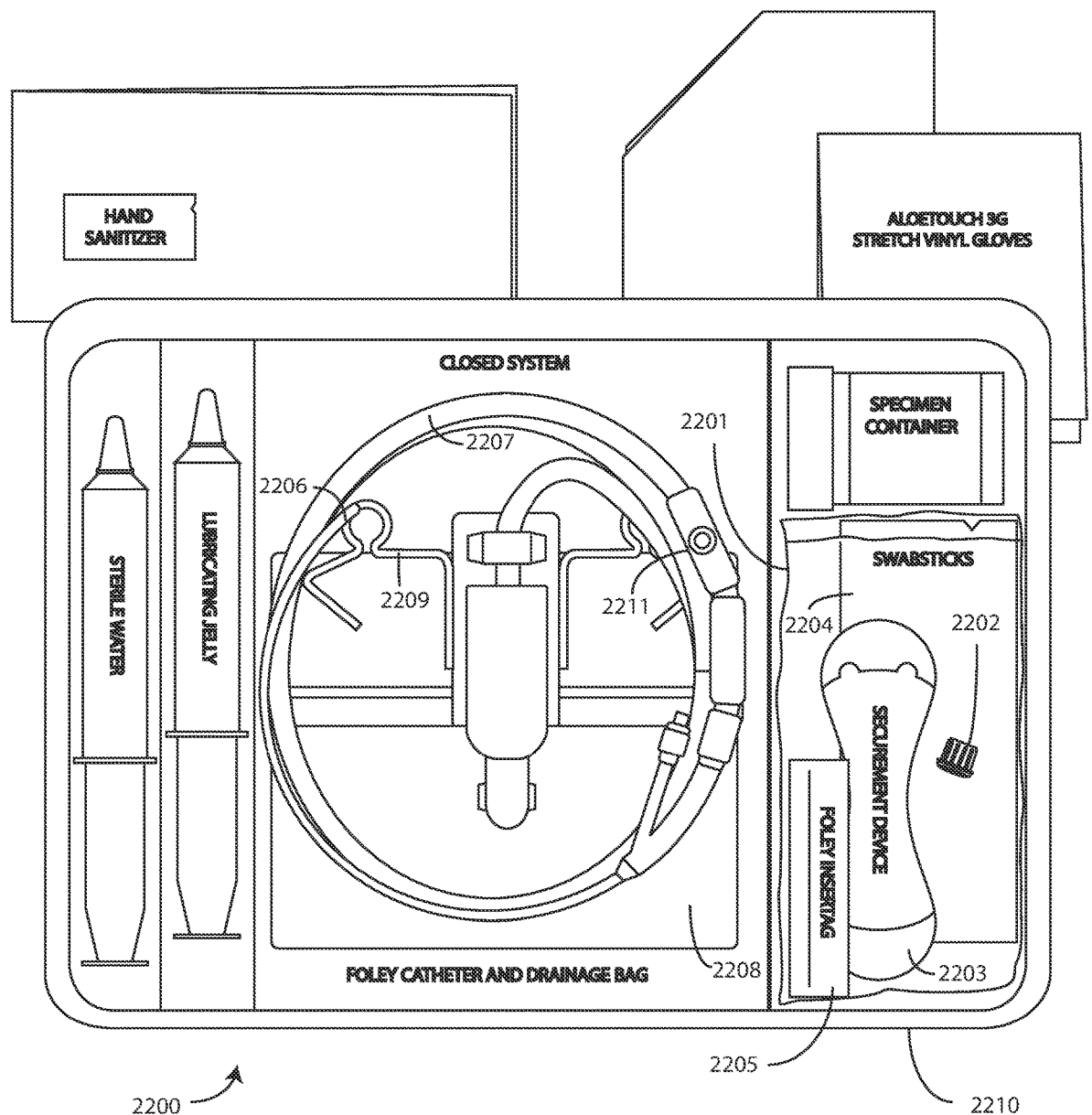
FIG. 22 illustrates another explanatory medical kit in accordance with one or more embodiments of the disclosure.

Turning now to FIG. 22, illustrated therein is another medical procedure kit 2200 configured in accordance with one or more embodiments of the disclosure. In this medical procedure kit 2200, the disinfectant cap 2202 is sealed within a container 2201 along with a Foley catheter securement device 2203, one or more swab sticks 2204, and a Foley catheter insertion tag 2205. Each of these items is situated within the container 2201 with the disinfectant cap 2202 within the medical procedure kit 2200, although fewer than these components, or additional components, could be situated within the container 2201 with the disinfectant cap 2202 as well.

As shown in FIG. 22, the medical procedure kit 2200 includes a Foley catheter 2206, its operatively coupled coiled tubing 702, and its operatively coupled fluid drain bag 703. As shown in FIG. 7, the coiled tubing 2207 is coupled between the Foley catheter 2206 and the fluid drain bag 2208.

A clip or other hanger 2209 can be coupled to the fluid drain bag 2208 so that the fluid drain bag 2208 can be coupled to a stand, bedrail, or other object. The coiled tubing 2207 may be coupled to the Foley catheter 2206, and the fluid drain bag 2208 coupled to the coiled tubing 2207, before the assembly is placed in the tray 2210. Alternatively, the Foley catheter 2206, the coiled tubing 2207, and the fluid drain bag 2208 can be separately stored in a tray, with each being coupled together once the tray is opened.

The Foley catheter 2206 includes a specimen sampling port 2211, which is operatively coupled to the coiled tubing 2207. Urine samples can be obtained from the specimen sampling port 2211. The Foley catheter 2206 can optionally include an inflation port as well.

The tray 2210 includes syringes and a specimen container stored therein. A first compartment of the tray 2210 accommodates the syringes, while a second compartment houses the Foley catheter 2206, the coiled tubing 2207, and the fluid drain bag 2208. The third compartment of the tray houses a specimen container in addition to the container 2201 housing the Foley catheter securement device 2203, the one or more swab sticks 2204, and the Foley catheter insertion tag 2205. The third compartment can accommodate other materials as well, including skin sanitizers and cleansing liquids, solutions, or gels.

Additional devices corresponding to Foley catheter use, including towels, drapes, rubber gloves, and so forth can be disposed in the tray 2210 as well. As an illustration of this flexibility, one or more towels can be disposed beneath the catheter assembly. Once the necessary components are disposed within the tray 2210, the tray 2210 can be sealed with a wrap to keep the internal components sterile. The wrap can be any of a number of types of material. The wrap can be a CSR wrap. While a CSR wrap is one example of a wrap that can be used, other wraps, such as plastic, cotton, linen, paper, or combinations thereof, can be substituted for the CSR wrap.

The CSR wrap can be folded about the tray 2210 for sealing and can be correspondingly unfolded to reveal the tray 2210. Once unfolded, the CSR wrap can then be used in the catheter insertion process. For example, an unfolded CSR wrap can be used to provide a sterile field in which the tray 2210 sits for unloading and subsequent use.

Printed instructions can then be attached to, disposed upon, or disposed within the tray 2210. The printed instructions can include a health care services portion and a patient portion. The health care services portion can include instructions telling the health care services provider, for example, how to set up a sterile or otherwise clean work environment, how to prepare the Foley catheter 2206 disposed within the tray 2210, how to use the other devices within the tray 2210, how to insert the Foley catheter 2206, how to secure the fluid drain bag 2208 to the Foley catheter 2206, how to empty the fluid drain bag 2208, how to obtain a urine sample, and so forth. The instructions can include pictures or illustrations showing visually how the various steps should be done as well.

The patient portion can include helpful suggestions or instructions for the patient. The patient portion can be detachably coupled to the health care services portion, such as by a perforated line that is easily torn to separate the patient portion from the health care services portion. Examples of suggestions or instructions that may be included in the patient portion include information on what a catheter is, what the patient should understand about the catheter, how to reduce the chance of getting an infection, information about infections commonly associated with catheters, symptoms of infections commonly associated with catheters, and suggestions for home use of the Foley catheter 2206. The health care services portion may include an instruction for the health care services provider to detach the patient portion from the health care services portion and instructions to discuss the patient portion with the patient.

The health care services portion can tell the medical services provider how to perform a standard catheterization procedure. For instance, the tray 2210 can be equipped with an adhesive label that can be used to identify the patient or specimen in the specimen container. Further, a label can be included to mark or otherwise identify the material in the fluid drain bag 2208 attached to the Foley catheter 2206. Such labels can include pre-printed fields, such as date, time and name. Further the printed instructions can notify the medical services provider that the devices disposed within the tray 2210 are ordered corresponding to use during the catheterization procedure.

The printed instructions can inform the medical services provider of special instructions. For instance, the printed instructions can inform the medical services provider not to leave a Foley catheter 2206 in a patient for more than forty-eight hours without a physician's approval. Where the printed instructions include such information, the labels included in the tray 2210 may have pre-printed fields for the time of insertion that can be filled in by the medical services provider performing the catheterization procedure.

Once the printed instructions have been affixed to, or placed with, within, or atop the tray 2210, the medical procedure kit 2200 can be sealed in a sterile wrap such as a thermally sealed bag. The thermally sealed bag can optionally include a preformed opening. For example, the opening can include one or more tabs that a health care services provider is instructed to pull to open the bag. Inclusion of a sterile wrap not only keeps the contents within the bag sterile, but also allows the instructions to be included with the tray assembly, yet outside the CSR wrap.

The printed instructions can be disposed atop the CSR wrap such that the health care services portion of the printed instructions is disposed on the top of the printed instructions, with the patient portion being disposed adjacent to the CSR wrap, such as when the printed instructions are configured as an accordion-style folded instruction pamphlet. While the printed instructions of can be configured as a folded, printed, separate article disposed atop the CSR wrap, rather than including separate printed instructions, the instructions for use can be printed on the CSR wrap as well.

Additional instruction materials may be included with the completed assembly as well. For example, an adhesive instruction tag can be affixed to the sterile wrap. The instruction tag may be adhered to an outer packaging that encloses the tray 2210, the sterile wrap material, or both. For example, the instruction tag can include information regarding whether a Foley catheter procedure is needed, as described above.

Figure 23:
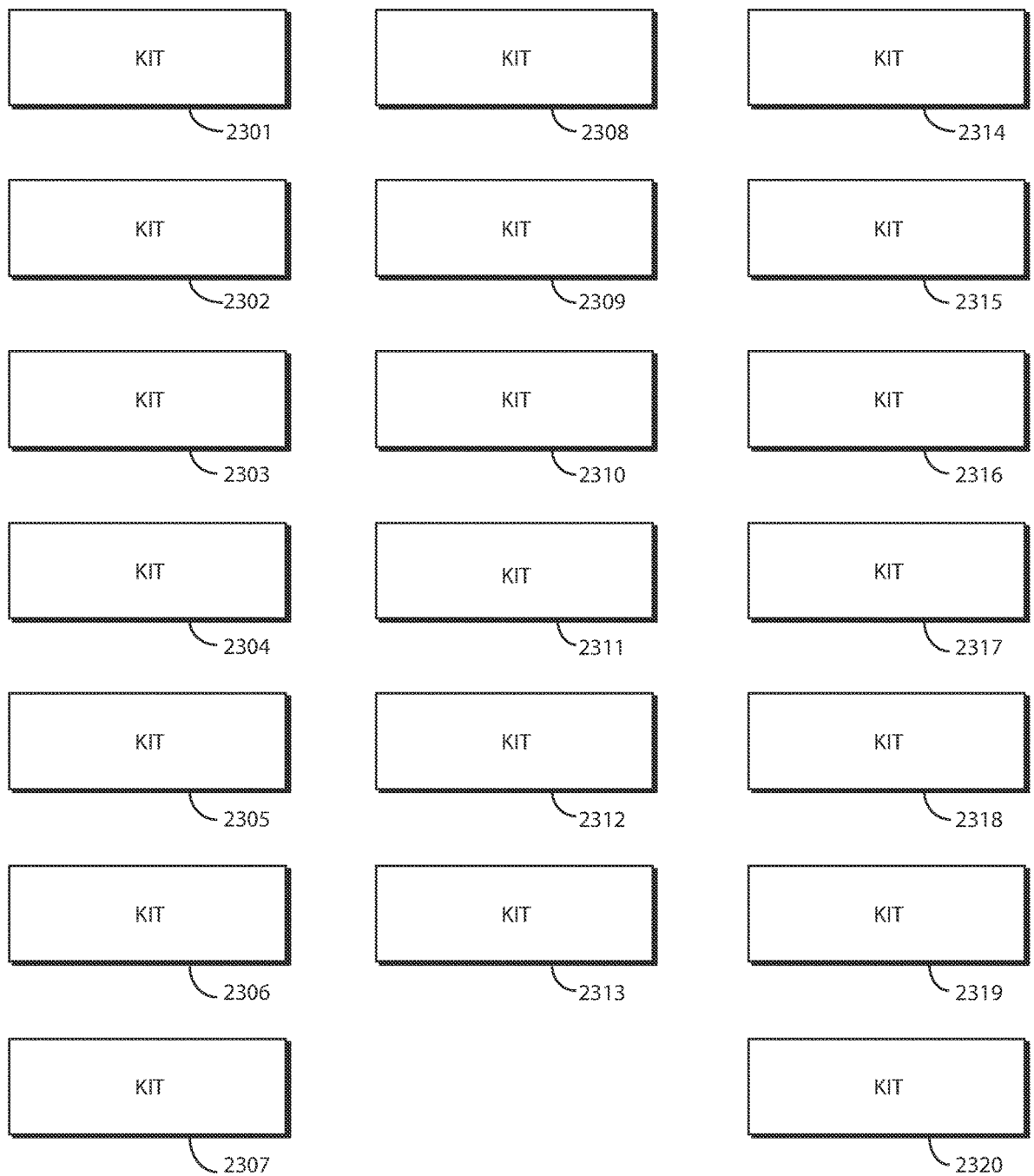
FIG. 23 illustrates various embodiments of the disclosure.

Turning now to FIG. 23, illustrated therein are various embodiments of the disclosure. The embodiments of FIG. 23 are shown as labeled boxes in FIG. 23 due to the fact that the individual components of these embodiments have been illustrated in detail in FIGS. 1-22, which precede FIG. 23. Accordingly, since these items have previously been illustrated and described, their repeated illustration is no longer essential for a proper understanding of these embodiments. Thus, the embodiments are shown as labeled boxes.

At 2301, a medical procedure kit comprises a Foley catheter having a specimen sampling port coupled thereto. At 2301, the medical procedure kit comprises a disinfectant cap that is selectively attachable to, and detachable from, the specimen sampling port of the Foley catheter.

At 2302, the medical procedure kit of 2301 further comprises a sponge situated within an interior of the disinfectant cap. At 2302 the sponge situates between a distal end of the specimen sampling port and a major surface of the interior of the disinfectant cap when the disinfectant cap is selectively attached to the specimen sampling port.

At 2303, the sponge of 2302 is pre-saturated with a disinfecting liquid. At 2304, the disinfecting liquid of 2303 comprises at least seventy percent isopropyl alcohol. At 2305, the specimen sampling port of 2304 comprises a urine sampling port.

At 2306, the medical procedure kit of 2305 comprises a container within which the disinfectant cap is situated in the medical procedure kit. At 2307, the container of 2306 comprises a plastic bag. At 2308, the medical procedure kit of 2306 further comprises a fluid drain bag and a coiled tubing coupling the Foley catheter to the fluid drain bag within the medical procedure kit, wherein the container is attached to the coiled tubing.

At 2309, the medical procedure kit of 2306 further comprises a first tray. At 2309, the medical procedure kit comprises a second tray nested atop, and suspended by, the first tray.

At 2309, the second tray defines a plurality of preformed compartments configured to receive and house a plurality of medical implements. At 2309, the Foley catheter is positioned within a Foley catheter compartment of the plurality of preformed compartments of the second tray.

At 2309, a drainage system is stowed within an interior of the first tray. At 2309, the drainage system comprises at least a portion of the coiled tubing coupled between the Foley catheter and the fluid drain bag. At 2309, the container is situated in one of the first tray or the second tray.

At 2310, the medical procedure kit of 2306 further comprises a Foley catheter securement device, one or more swab sticks, and a Foley catheter insertion tag each situated within the container with the disinfectant cap within the medical procedure kit.

At 2311, the medical procedure kit of 2310 further comprises a single-layer tray comprising a first compartment at least partially bounded by a first base member, a second compartment at least partially bounded by a second base member, and a third compartment at least partially bounded by a third base member. At 2311, the medical procedure kit comprises at least one syringe situated within the first compartment.

At 2311 the medical procedure kit comprises the Foley catheter, coupled to the coiled tubing and the fluid drain bag, and disposed within the second compartment. At 2311, the container is situated within the third compartment.

At 2312, a medical procedure kit comprises a Foley catheter coupled to a urine sampling port. At 2312, the medical procedure kit comprises a disinfectant cap that is selectively attachable to, and detachable from, the urine sampling port of the Foley catheter. At 2312, the disinfectant cap includes a bacteria-killing fluid held within a fluid-retaining medium situated within an interior of the disinfectant cap. At 2312, the disinfectant cap prevents bacteria from entering the Foley catheter through the urine sampling port when attached to the urine sampling port.

At 2313, the bacteria-killing fluid of 2312 saturates the fluid-retaining medium. At 2314, the fluid-retaining medium of 2313 comprises a sponge and the bacteria-killing fluid comprises isopropyl alcohol.

At 2315, the medical procedure kit of 2314 further comprises a tray comprising a first compartment at least partially bounded by a first base member, a second compartment at least partially bounded by a second base member, and a third compartment at least partially bounded by a third base member. At 2315, the medical procedure kit comprises at least one syringe situated within the first compartment.

At 2315, the medical procedure kit comprises the Foley catheter, coupled to a coiled tubing and a fluid drain bag, disposed within the second compartment. At 2315, the medical procedure kit comprises a container enclosing a Foley catheter securement device, one or more swab sticks, a Foley catheter insertion tag, and the disinfectant cap situated in the third compartment.

At 2316, the urine sampling port of 2314 is threaded. At 2316, the disinfectant cap comprises complementary threads along the interior.

At 2317, the interior of the disinfectant cap of 2314 defines a friction fit surface to frictionally retain the disinfectant cap to an exterior of the urine sampling port when the disinfectant cap is attached to the urine sampling port.

At 2318, a medical procedure kit comprises at least one tray supporting a Foley catheter coupled to a urine sampling port. At 2318, the medical procedure kit comprises a package situated within the medical procedure kit containing a disinfectant cap that is selectively attachable to, and detachable from, the urine sampling port of the Foley catheter. At 2318, the disinfectant cap includes a sponge wetted by a solution comprising at least seventy-percent isopropyl alcohol situated within an interior of the disinfectant cap.

At 2319, the at least one tray of 2318 comprises a single layer tray defining a first compartment and a second compartment, with the Foley catheter and the urine sampling port situated within the first compartment and the package situated in the second compartment.

At 2320, the at least one tray of 2318 comprises a first tray and a second tray nested atop, and suspended by, the first tray. At 2320, the second tray defines a plurality of preformed compartments configured to receive and house a plurality of medical implements.

At 2320, the Foley catheter is positioned within a Foley catheter compartment of the plurality of preformed compartments of the second tray. At 2320, a drainage system is stowed within an interior of the first tray.

At 2320, the drainage system comprises at least a portion of a coiled tubing coupled between the Foley catheter and a fluid drain bag. At 2320, the package is situated in the second tray.

The following applications are incorporated herein by reference for all purposes: Ser. No. 14/793,455, filed Jul. 7, 2015; Ser. No. 13/860,902, filed Apr. 11, 2013; Ser. No. 13/155,026, filed Jun. 7, 2011; Ser. No. 61/352,140, filed Jun. 7, 2010; Ser. No. 61/352,155, filed Jun. 7, 2010; Ser. No. 61/428,944, filed Dec. 31, 2010; Ser. No. 61/437,796, filed Jan. 31, 2011; Ser. No. 12/495,148, filed Jun. 30, 2009; Ser. No. 12/647,515, filed Dec. 27, 2009; Ser. No. 13/153,265, filed Jun. 3, 2011; Ser. No. 15/977,944, filed May 11, 2018; PCT/US2019/038051, filed Jun. 18, 2019; and Ser. No. 13/153,300, filed Jun. 3, 2011.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

For example, the swab sticks may be saturated with CHG rather than PVP. Additionally, other catheters could be substituted for the Foley catheter in the various embodiments, including a 3-way Foley catheter, a Coude tip with temp sensing Foley catheter, or other type of catheter.

Figure 24:
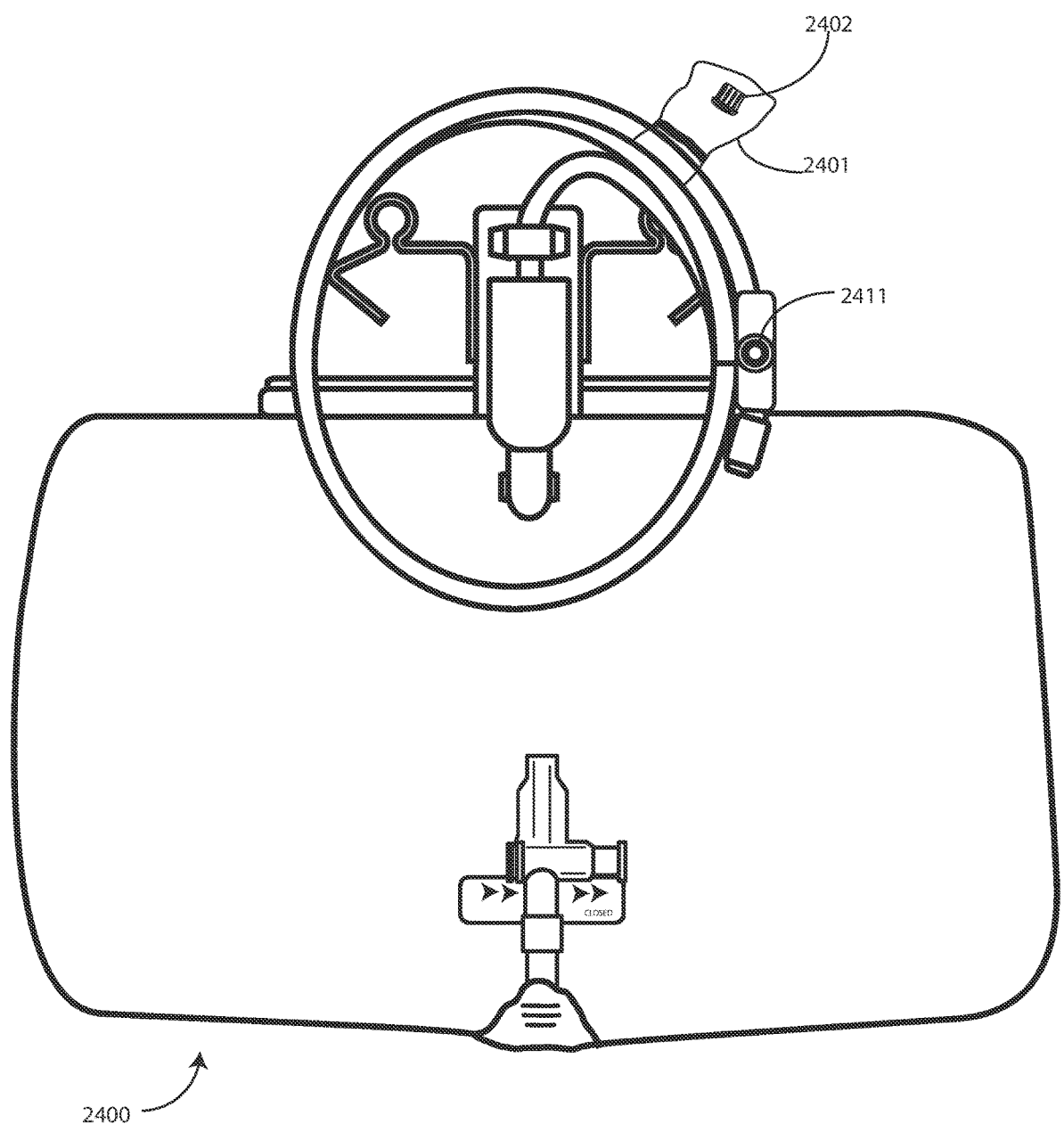
FIG. 24 illustrates a single pull drain bag.

Additionally, while one explanatory medical device described above was a Foley catheter, as noted disinfectant caps configured in accordance with embodiments of the disclosure can be used with other medical devices as well. Illustrating by example, turning now to FIG. 24, illustrated therein is another medical device 2400 configured in accordance with one or more embodiments of the disclosure. The medical device 2400 of FIG. 24 is a single draw fluid bag having a specimen sampling port 2411 attached thereto. This medical device 2400 can be included with a corresponding medical kit, or alternatively can be sold as a separate component.

In the illustrative embodiment of FIG. 24, a disinfectant cap 2402 is sealed within a container 2401 and is attached to a coiled tubing 2407 that is operatively coupled to the medical device 2400. The specimen sampling port 2411 is operatively coupled to the base of the single draw fluid bag. Urine samples can be obtained from the specimen sampling port 2411.

As previously described, the disinfectant cap 2402 can be attached to the specimen sampling port 2411 to prevent bacteria from entering the specimen sampling port 2411. Additionally, the inclusion of the bacteria-killing fluid kills any bacteria present along the surfaces of the specimen sampling port 2411. Advantageously, when the disinfectant cap 2402 is removed from the specimen sampling port 2411, the surfaces are bacteria and microbe free, thereby ensuring that the patient is not infected when additional urine samples are taken from the patient through the specimen sampling port 2411.

Figure 25:
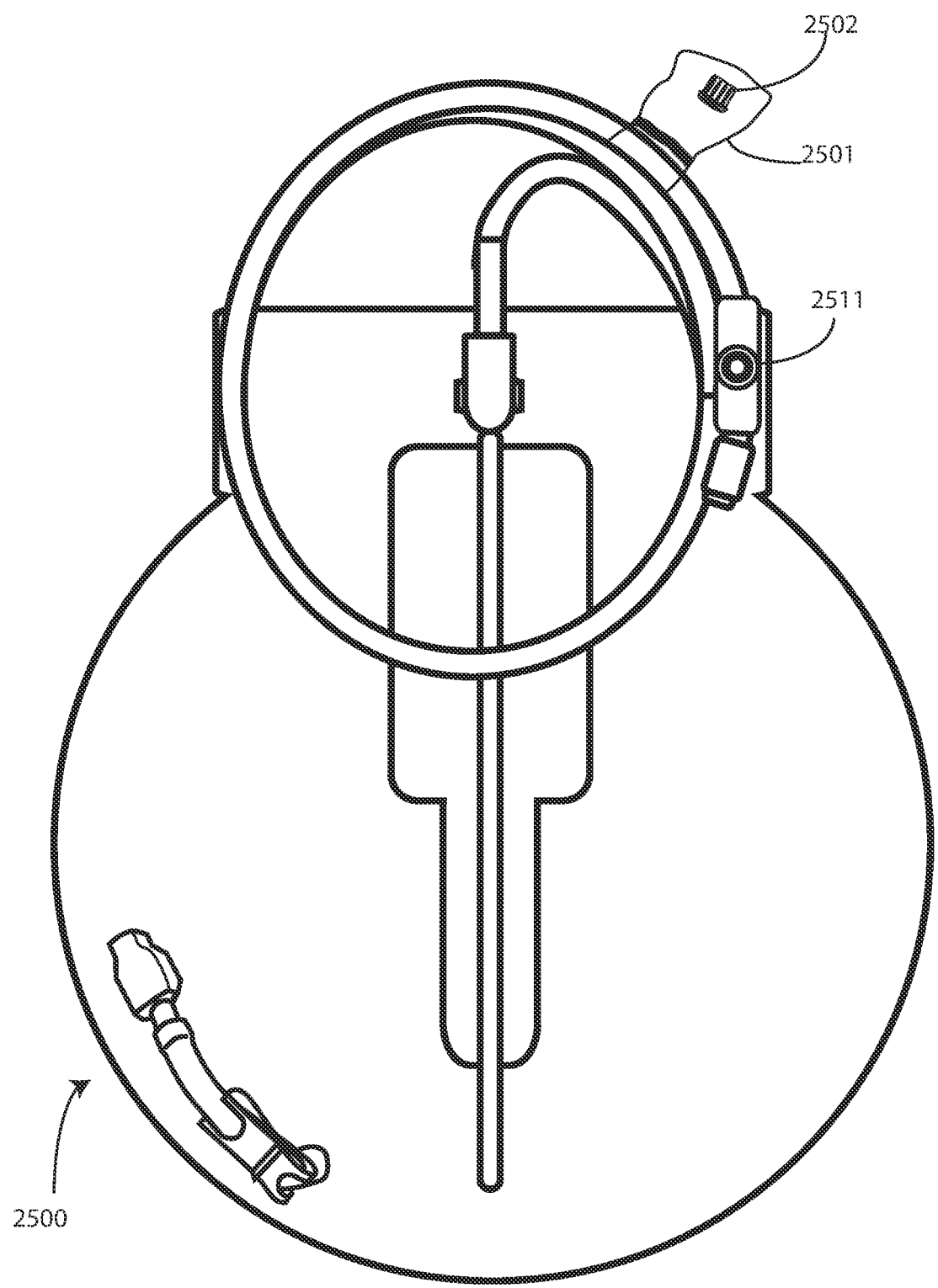
FIG. 25 illustrates a urine meter.

Turning now to FIG. 25, illustrated therein is another medical device 2500 configured in accordance with one or more embodiments of the disclosure. The medical device 2500 of FIG. 25 is a urine meter having a specimen sampling port 2511 attached thereto. This medical device 2500 can be included with a corresponding medical kit, or alternatively can be sold as a separate component.

In the illustrative embodiment of FIG. 25, a disinfectant cap 2502 is sealed within a container 2501 and is attached to a coiled tubing 2507 that is operatively coupled to the urine meter. Urine samples can be obtained from the specimen sampling port 2511.

As previously described, the disinfectant cap 2502 can be attached to the specimen sampling port 2511 to prevent bacteria from entering the specimen sampling port 2511. When the disinfectant cap 2502 is removed from the specimen sampling port 2511, the surfaces are bacteria and microbe free, thereby ensuring that the patient is not infected when additional urine samples are taken from the patient through the specimen sampling port 2511.

While a Foley catheter, a single draw specimen bag, and a urine meter are illustrative medical devices having specimen sampling ports with which disinfectant caps of the present invention can be used, other such medical devices will be obvious to those of ordinary skill in the art having the benefit of this disclosure. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A medical procedure kit, comprising:
    a Foley catheter having a specimen sampling port coupled thereto;
    coiled tubing attached to the Foley catheter;
    a disinfectant cap that is selectively attachable to, and detachable from, the specimen sampling port of the Foley catheter; and
    a container attached to the coiled tubing within which the disinfectant cap is situated.

2. The medical procedure kit of claim 1, further comprising a sponge situated within an interior of the disinfectant cap, wherein the sponge situates between a distal end of the specimen sampling port and a major surface of the interior of the disinfectant cap when the disinfectant cap is selectively attached to the specimen sampling port.

3. The medical procedure kit of claim 2, wherein the sponge is pre-saturated with a disinfecting liquid.

4. The medical procedure kit of claim 3, wherein the disinfecting liquid comprises at least seventy percent isopropyl alcohol.

5. The medical procedure kit of claim 4, wherein the specimen sampling port comprises a urine sampling port.

6. The medical procedure kit of claim 5, wherein the disinfectant cap is sealed within the container within the medical procedure kit.

7. The medical procedure kit of claim 6, wherein the container comprises a sterilized plastic bag encapsulating the disinfectant cap after sterilization.

8. The medical procedure kit of claim 6, further comprising a fluid drain bag with the coiled tubing coupling the Foley catheter to the fluid drain bag within the medical procedure kit.

9. The medical procedure kit of claim 6, further comprising:
    a first tray;
    a second tray nested atop, and suspended by, the first tray, the second tray defining a plurality of preformed compartments configured to receive and house a plurality of medical implements;
    the Foley catheter positioned within a Foley catheter compartment of the plurality of preformed compartments of the second tray; and
    a drainage system stowed within an interior of the first tray, the drainage system comprising at least a portion of the coiled tubing coupled between the Foley catheter and a fluid drain bag.

10. The medical procedure kit of claim 6, further comprising a Foley catheter securement device, one or more swab sticks, and a Foley catheter insertion tag each situated within the container with the disinfectant cap within the medical procedure kit.

11. The medical procedure kit of claim 10, further comprising:
    a single-layer tray comprising a first compartment at least partially bounded by a first base member, a second compartment at least partially bounded by a second base member, and a third compartment at least partially bounded by a third base member;
    at least one syringe situated within the first compartment; and
    the Foley catheter, coupled to the coiled tubing and a fluid drain bag, disposed within the second compartment.

12. A medical procedure kit, comprising:
a Foley catheter coupled to a urine sampling port; and
a disinfectant cap that is selectively attachable to, and detachable from, the urine sampling port of the Foley catheter, the disinfectant cap including a bacteria-killing fluid held within a fluid-retaining medium situated within an interior of the disinfectant cap and spanning an underside of a top of the disinfectant cap;
the disinfectant cap preventing bacteria from entering the Foley catheter through the urine sampling port when attached to the urine sampling port.

13. The medical procedure kit of claim 12, wherein bacteria-killing fluid saturates the fluid-retaining medium.

14. The medical procedure kit of claim 13, wherein the fluid-retaining medium comprises a sponge and the bacteria-killing fluid comprises isopropyl alcohol.

15. The medical procedure kit of claim 14, further comprising:
a tray comprising a first compartment at least partially bounded by a first base member, a second compartment at least partially bounded by a second base member, and a third compartment at least partially bounded by a third base member;
at least one syringe situated within the first compartment;
the Foley catheter, coupled to a coiled tubing and a fluid drain bag, disposed within the second compartment; and
a container enclosing a Foley catheter securement device, one or more swab sticks, a Foley catheter insertion tag, and the disinfectant cap situated in the third compartment.

16. The medical procedure kit of claim 14, wherein the urine sampling port is threaded, and the disinfectant cap comprises complementary threads along the interior.

17. The medical procedure kit of claim 14, wherein the interior of the disinfectant cap defines a friction fit surface to frictionally retain the disinfectant cap to an exterior of the urine sampling port when the disinfectant cap is attached to the urine sampling port.

18. A medical procedure kit, comprising:
at least one tray supporting a Foley catheter coupled to a urine sampling port and a coiled tubing; and
a package attached to the coiled tubing situated within the medical procedure kit containing a disinfectant cap that is selectively attachable to, and detachable from, the urine sampling port of the Foley catheter, the disinfectant cap including a sponge wetted by a solution comprising at least seventy-percent isopropyl alcohol situated within an interior of the disinfectant cap.

19. The medical procedure kit of claim 18, wherein the at least one tray comprises a single layer tray defining a first compartment and a second compartment, with the Foley catheter and the urine sampling port situated within the first compartment and the package situated in the second compartment.

20. The medical procedure kit of claim 18, wherein the at least one tray comprises:
a first tray;
a second tray nested atop, and suspended by, the first tray, the second tray defining a plurality of preformed compartments configured to receive and house a plurality of medical implements;
the Foley catheter positioned within a Foley catheter compartment of the plurality of preformed compartments of the second tray; and
a drainage system stowed within an interior of the first tray, the drainage system comprising at least a portion of the coiled tubing coupled between the Foley catheter and a fluid drain bag.

* * * * *